United States Patent
Shea et al.

(10) Patent No.: US 10,523,000 B2
(45) Date of Patent: Dec. 31, 2019

(54) ARC FLASH MITIGATION SWITCH FOR QUENCHING EXTERNAL ARC FAULTS IN LOW VOLTAGE SWITCHGEAR

(71) Applicant: EATON CORPORATION, Cleveland, OH (US)

(72) Inventors: John Joseph Shea, Pittsburgh, PA (US); Paul J. Rollmann, Menomonee Falls, WI (US); Dan E. Hrncir, Arden, NC (US); Jason B. Carrodus, Beaver, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 719 days.

(21) Appl. No.: 15/078,747

(22) Filed: Mar. 23, 2016

(65) Prior Publication Data

US 2016/0285259 A1     Sep. 29, 2016

Related U.S. Application Data

(60) Provisional application No. 62/137,269, filed on Mar. 24, 2015.

(51) Int. Cl.
*H02H 9/04* (2006.01)
*H01H 33/53* (2006.01)

(52) U.S. Cl.
CPC ............ *H02H 9/041* (2013.01); *H01H 33/53* (2013.01)

(58) Field of Classification Search
CPC .......... H01H 9/30; H01H 9/541; H01H 33/53; H02H 1/0015; H02H 9/041; H01T 4/12; H01T 2/02

(Continued)

(56) References Cited

U.S. PATENT DOCUMENTS

| 4,878,144 A | 10/1989 | Nebon |
| 6,141,192 A | 10/2000 | Garzon |

(Continued)

FOREIGN PATENT DOCUMENTS

| DE | 101 29 139 A1 | 1/2003 |
| EP | 2 675 033 A1 | 12/2013 |
| WO | 2008/138557 A1 | 11/2008 |

OTHER PUBLICATIONS

DE-10129139; Shang Wenkai; Date: Jan. 9, 2003; Device for quenching arc in switching system, has closable contact point with contact pieces, and intermediate electrode with trigger electrode protruding into its central opening (Year: 2003).*

(Continued)

*Primary Examiner* — Dharti H Patel
(74) *Attorney, Agent, or Firm* — Eckert Seamans Cherin & Mellott, LLC

(57) ABSTRACT

Systems, methods, and devices, for forming and using an arc flash mitigation switch are provided. In one exemplary embodiment, an arc flash mitigation switch includes a cylindrical shell having a first end cap and a second end cap located at either end of the cylindrical shell. A first and second conductive feed through extend through the first and second end cap, respectively, at one end, and at the other connect to a first and second electrode separated by a gap. The exemplary arc flash mitigation switch further includes a trigger feed through that receives a trigger current that commutates the external arc flash event into the arc flash mitigation switch, quenching the external hazard.

19 Claims, 21 Drawing Sheets

(58) Field of Classification Search
USPC .......................................................... 361/2–6
See application file for complete search history.

(56) References Cited

U.S. PATENT DOCUMENTS

| | | | |
|---|---|---|---|
| 6,724,604 | B2 | 4/2004 | Shea |
| 6,839,209 | B2 | 1/2005 | Shea et al. |
| 7,140,702 | B2 | 11/2006 | Byron et al. |
| 7,145,757 | B2 | 12/2006 | Shea et al. |
| 7,800,888 | B2 | 9/2010 | Morris et al. |
| 7,929,260 | B2 | 4/2011 | Roscoe et al. |
| 8,199,022 | B2 | 6/2012 | Morris et al. |
| 8,228,652 | B2 | 7/2012 | Yanniello |
| 8,284,541 | B2 | 10/2012 | Shea et al. |
| 8,305,736 | B2 | 11/2012 | Yee et al. |
| 8,319,136 | B2 | 11/2012 | Byron et al. |
| 8,350,175 | B2 | 1/2013 | Delfino et al. |
| 2003/0231443 | A1 | 12/2003 | Shea et al. |
| 2005/0219020 | A1 | 10/2005 | Wabner |
| 2006/0067018 | A1 | 3/2006 | Malkowski, Jr. et al. |
| 2008/0170344 | A1 | 7/2008 | Byron |
| 2009/0308845 | A1 | 12/2009 | Bohori et al. |
| 2011/0254534 | A1 | 10/2011 | Dorr et al. |
| 2011/0255199 | A1 | 10/2011 | Sutherland |
| 2011/0285483 | A1 | 11/2011 | Morris et al. |
| 2011/0315662 | A1 | 12/2011 | Byron et al. |
| 2012/0057263 | A1 | 3/2012 | Roscoe et al. |
| 2012/0097413 | A1 | 4/2012 | Bugaris et al. |
| 2012/0168407 | A1 | 7/2012 | Delfino et al. |
| 2012/0169208 | A1 | 7/2012 | Engel et al. |
| 2013/0033796 | A1 | 2/2013 | Shea |
| 2013/0120879 | A1 | 5/2013 | Shea |
| 2013/0265737 | A1 | 10/2013 | Bugaris et al. |
| 2013/0279083 | A1 | 10/2013 | Faber |
| 2014/0192451 | A1 | 7/2014 | Locker et al. |
| 2014/0192458 | A1 | 7/2014 | Valdes |
| 2015/0236495 | A1 | 8/2015 | Shea et al. |
| 2015/0236496 | A1 | 8/2015 | Shea et al. |

OTHER PUBLICATIONS

European Patent Office, "International Search Report and Written Opinion", PCT/US2015/011309, May 20, 2015, 9 pp.
European Patent Office, "International Search Report and Written Opinion", PCT/US2015/011291, May 20, 2015, 9 pp.
European Patent Office, Partial International Search Report (Corresponding PCT/US2016/023708), dated Jun. 20, 2016, 7 pp.

* cited by examiner

ARC FLASH MITIGATION SWITCH FOR QUENCHING EXTERNAL ARC FAULTS IN LOW VOLTAGE SWITCHGEAR

CROSS-REFERENCE TO RELATED APPLICATION

This application claims the benefit of U.S. Provisional Patent Application No. 62/137,269, which was filed on Mar. 24, 2015, and is entitled "ARC FLASH MITIGATION SWITCH FOR QUENCHING EXTERNAL ARC FAULTS IN LOW VOLTAGE SWITCHGEAR".

BACKGROUND OF THE DISCLOSED CONCEPT

Field of the Disclosed Concept

The present disclosed concept generally relates to systems, methods, and devices for using and forming arc flash mitigation switches that allow an external arc fault in low or medium voltage switchgear to be quenched quickly and safely. The present disclosed concept also generally relates to systems, methods, and devices that provide a safe and effective means to power and activate an arc flash shunting switch for various arc flash mitigation switches.

Description of the Related Art

Electrical safety hazards associated with low or medium voltage power applications, such as motor-control centers ("MCCs"), having become increasingly important as the number of low/medium voltage power applications has grown. For example, various industries using low/medium voltage switchgear include, but are not limited to, the oil and gas industry, the paper and pulp industry, data centers, financial institutions, power generation facilities, and even mining sites. The dangers associated with arc flash events is even more relevant for these industries as arc flash events can occur randomly and unintentionally. Some of the causes of arc flash events relate to maintenance issues, accidents, procedures not being followed, test equipment failure, insulation degradation within the switchgear, and animals damaging switchgear components.

Arc flash events can be hazardous to individuals working within or near the low/medium voltage power equipment. As there can be up to 100 MJ (e.g., 100 million Joules) of energy associated with arc flashes, personal injury, bodily harm, and even death, are all possible outcomes. In addition to the hazards for humans, there are also tremendous financial dangers associated with arc flash events. For example, an arc flash at a data center may damage expensive equipment that is extremely costly to install and replace. Furthermore, the potential loss of business that will occur due to equipment being non-functional from an arc flash incident can be financially crippling.

Thus, it would be beneficial for there to be systems, methods, and devices that allow for safe and effective arc flash mitigation including a current limiting switch. Furthermore, it would also be beneficial for there to be systems, methods, and devices that provide a process for a highly reliable trigger to facilitate an arc flash mitigation switch.

SUMMARY OF THE DISCLOSED CONCEPT

Accordingly, it is an objective of this disclosed concept to provide an arc flash mitigation switch that enables a quick and efficient quenching of an external arc flash event. Furthermore, it is another objective of this disclosed concept to provide an arch flash mitigation sensing and triggering circuit for extinguishing an external arc flash.

In one embodiment, an arc flash mitigation switch includes a cylindrical shell that has a substantially constant thickness annularly about a longitudinal axis and forms an inner cavity. The arc flash mitigation switch also includes a first and second electrode that are centered about a radial axis of the cylindrical shell and the longitudinal axis of the cylindrical shell. At a first end of the cylindrical shell is a first end cap and at a second end of the cylindrical shell is a second end cap. The first end cap includes a first circular opening about the longitudinal axis and has a first diameter, and the second end cap includes a second circular opening about the longitudinal axis and has a second diameter. Furthermore, the arc flash mitigation switch includes a first and second conductive feed through aligned with the longitudinal axis. The first conductive feed through extends through the first circular opening to the first electrode, and the second conductive feed through extends through the second circular opening to the second electrode. The arc flash mitigation switch also includes a trigger feed through. A first portion of the trigger feed through extends through the first end cap, and a second portion of the trigger feed through is electrically coupled to an inner surface of the first electrode that faces an inner surface of the second electrode.

In a second embodiment, a system for mitigating arc flash events is described. The system includes a first, second, and third low voltage power bar, at least a first and second support bar, and at least two arc flash mitigation switches. The first, second, and third low voltage power bars are each substantially parallel to one another and separated by a first distance. The at least first and second support bars are substantially parallel to one another and separated by a second distance from one another, where the at least first and second support bars are perpendicular to the first, second, and third low voltage power bus bars. A first end of a first arc flash mitigation switch is coupled to the first low voltage power bar and a first end of a second arc flash mitigation switch is electrically coupled to the third low voltage power bar. Furthermore, a second end of the first arc flash mitigation switch and a second end of the second arc flash mitigation switch are both electrically coupled to the second low voltage power bar.

In a third exemplary embodiment, a brazed arc flash mitigation switch is described. The brazed arc flash mitigation switch includes a cylindrical shell having a substantially constant thickness annularly about a longitudinal axis. The brazed arc flash mitigation switch also includes a first non-conductive end cap located at a first end of the cylindrical shell, which includes a first opening, and a second non-conductive end cap located at a second end of the cylindrical shell, which includes a second opening. The brazed arc flash mitigation switch further includes a first transition piece operable to seal the first non-conductive end cap with the first end of the cylindrical shell, and a second transition piece operable to seal the second non-conductive end cap with the second end of the cylindrical shell. Furthermore, a first and second conductive feed through are included, where a first end of the first conductive feed through extends through the first opening of the non-conductive end cap and a second end of the first conductive feed through extends to a first electrode within the cylindrical shell, and a second end of the second conductive feed through extends through the second opening of the second non-conductive end cap and a second end of the second conductive feed through extends to a second electrode within the cylindrical shell.

In a fourth exemplary embodiment, an arc flash trigger circuit for triggering an arc flash mitigation switch connected to the arc flash trigger circuit is described. The arc flash trigger circuit includes at least one current transformer, at least one high-voltage capacitor, an optical transistor coupled to a transistor, and at least one gas discharge tube. When both the optical transistor detects light and one of the at least one current transformer detects an arc fault, the arc flash trigger circuit is operable to open the transistor and allows current to flow into the at least one of high-voltage capacitor thereby charging them. The arc flash trigger circuit, in response to the at least one high-voltage capacitor charging, causes one of the at least one gas discharge tubes to conduct energy to a trigger ribbon, where a trigger current is sent to the trigger ribbon in response to one of the at least one gas discharge tubes conducting energy, which causes the trigger ribbon to close the arc flash mitigation switch.

In one embodiment, the arc flash trigger circuit includes three current transformers.

In one embodiment, the arc flash trigger circuit includes five high voltage capacitors connected in parallel, each having a substantially same capacitance.

In one embodiment, the arc flash trigger circuit includes at least one bleed down resistor connected in parallel with the at least one voltage capacitor. The at least one bleed down resistor ensures that static charge does not build up on the at least one high voltage capacitor.

In one embodiment, the arc flash trigger circuit includes a protection diode connected in parallel with the at least one high voltage capacitor. The at least one high voltage capacitor includes a spark gap breakdown potential corresponding to a first voltage. Additionally, the protection diode is operable to start conducting at a second voltage, the second voltage being at least one of: less than the first voltage, equal to the first voltage, and negative with respect to the first voltage.

In one embodiment, the arc flash trigger circuit includes at least one low impedance resistor and a charge dissipation resistor. The low impedance resistor is connected in parallel with the charge dissipation resistor.

In one embodiment, the arc flash trigger circuit's optical transistor is connected to an optical cable, allowing light detected by the optical transistor to be received by the optical cable.

In one embodiment, the at least one high voltage capacitor of the arc flash trigger circuit is operable to charge within a first period of time. In one embodiment, the first period of time is between 0.1 milliseconds and 50 milliseconds.

In a fifth exemplary embodiment, a method for mitigating an external arc flash by triggering an arc flash mitigation switch using an auxiliary power-free arc flash trigger circuit is described. An external arc fault is determined to be occurring on at least one of current transformer and a light signal is detected using an optical transistor. In response to both the external arc fault occurring on the at least one current transformer and the light signal being detected by the optical transistor, at least one high-voltage capacitor is allowed to charge to a spark gap breakdown potential. A trigger current is then generated due to at least one gas discharge tube breaking down and conducting energy received from the at least one high-voltage capacitor.

In one embodiment, an external fault is determined to occur at substantially the same time as a light signal is detected.

In one embodiment, the at least one high-voltage capacitor includes a plurality of high-voltage capacitors that are connected to one another in parallel.

In one embodiment, the plurality of high-voltage capacitors have the substantially same capacitance and voltage.

In one embodiment, the trigger current is sent to a trigger ribbon within the arc flash mitigation switch.

In one embodiment, the at least one high-voltage capacitor is charged to the breakdown potential in a first period of time.

In one embodiment, the first period of time is between 0.1 milliseconds and 50 milliseconds.

In one embodiment, the spark gap breakdown potential for the at least one high-voltage capacitor is between 1000 and 4000 V.

In a sixth exemplary embodiment, a rack-in arc flash mitigation system for mitigating an external arc flash event is provided. The arc flash mitigation system includes at least one arc flash mitigation switch and an arc flash trigger circuit. The arc flash trigger circuit is operable to determine that an external arc flash event is occurring and generate a trigger current in response. The trigger current is sent to a trigger ribbon within the at least one arc flash mitigation switch, and the external arc flash event is commutated into the at least one arc flash mitigation switch in response to the trigger current being sent to the trigger ribbon.

In one embodiment, the at least one arc flash mitigation switch includes two arc flash mitigation switches that are oriented at least one of horizontal and vertical.

In one embodiment, the at least one arc flash mitigation switch includes three arc flash mitigation switches that are oriented at least one of horizontal and vertical.

BRIEF DESCRIPTION OF THE DRAWINGS

The above and other features of the present disclosed concept, its nature and various advantages will be more apparent upon consideration of the following detailed description, taken in conjunction with the accompanying drawings in which like reference characters refer to like parts throughout, and in which.

DETAILED DESCRIPTION OF EXEMPLARY EMBODIMENTS

The present disclosed concept may take form in various components and arrangements of components, and in various techniques, methods, or procedures and arrangements of steps. The referenced drawings are only for the purpose of illustrated embodiments, and are not to be construed as limiting the present disclosed concept. Various inventive features are described below that can each be used independently of one another or in combination with other features. Furthermore, as used herein, the singular form of "a", "an", and "the" include plural references unless the context clearly dictates otherwise. Still further, as used herein, the term "number" shall mean one or an integer greater than one (e.g., a plurality).

As used herein, the term "connected" or "coupled" shall mean that two or more parts are joined together directly or joined through one or more intermediate parts. Furthermore, the term "attach" or "attached", as used herein, shall mean that two or more parts are joined together directly or through one or more intermediate parts. Further still, as used herein, the term "electrically coupled" or "electrically connected" or "electrically attached" shall mean that two or more parts are joined together directly or through one or more intermediate parts such that an electrical charge or current may flow between the two or more parts. Yet further still, as used herein, the term "fluid seal" or "fluidly seal" shall mean the two or more parts are joined together such that substantially no fluid or gas may be capable of passing there between (e.g., less than 5%). In particular, as the arc flash mitigation switches described herein are under high pressure when in use, a fluid seal as used herein may refer to an air-tight seal such that air or any other gas may not be capable of passing between two parts (e.g., approximately 0%). Additionally, as used herein, the term "horizontal" corresponds to a direction perpendicular with a direction of gravity or another directional vector, while the term "vertical" corresponds to a direction parallel with the direction of gravity or another directional vector such that horizontal and vertical are orthogonal to one another.

The disclosed low voltage (e.g., less than 1,000 $V_{RMS}$) arc flash mitigation switch employs a trigger that activates the arc flash mitigation switch. The example triggering mechanism causes a breakdown of a gap between electrodes within a sealed cylindrical shell of the arc flash mitigation switch. The arc flash mitigation switch includes substantially high melting point conductors enclosed within the sealed cylindrical shell structured to contain an arcing fault. Upon detection of an external arcing fault, the triggering mechanism causes the external arcing fault to commutate into the arc flash mitigation switch, thereby eliminating the external arcing fault and protecting personal and equipment from various hazards associated with uncontrolled arc faults (e.g., injury, death, etc.).

Figure 1:
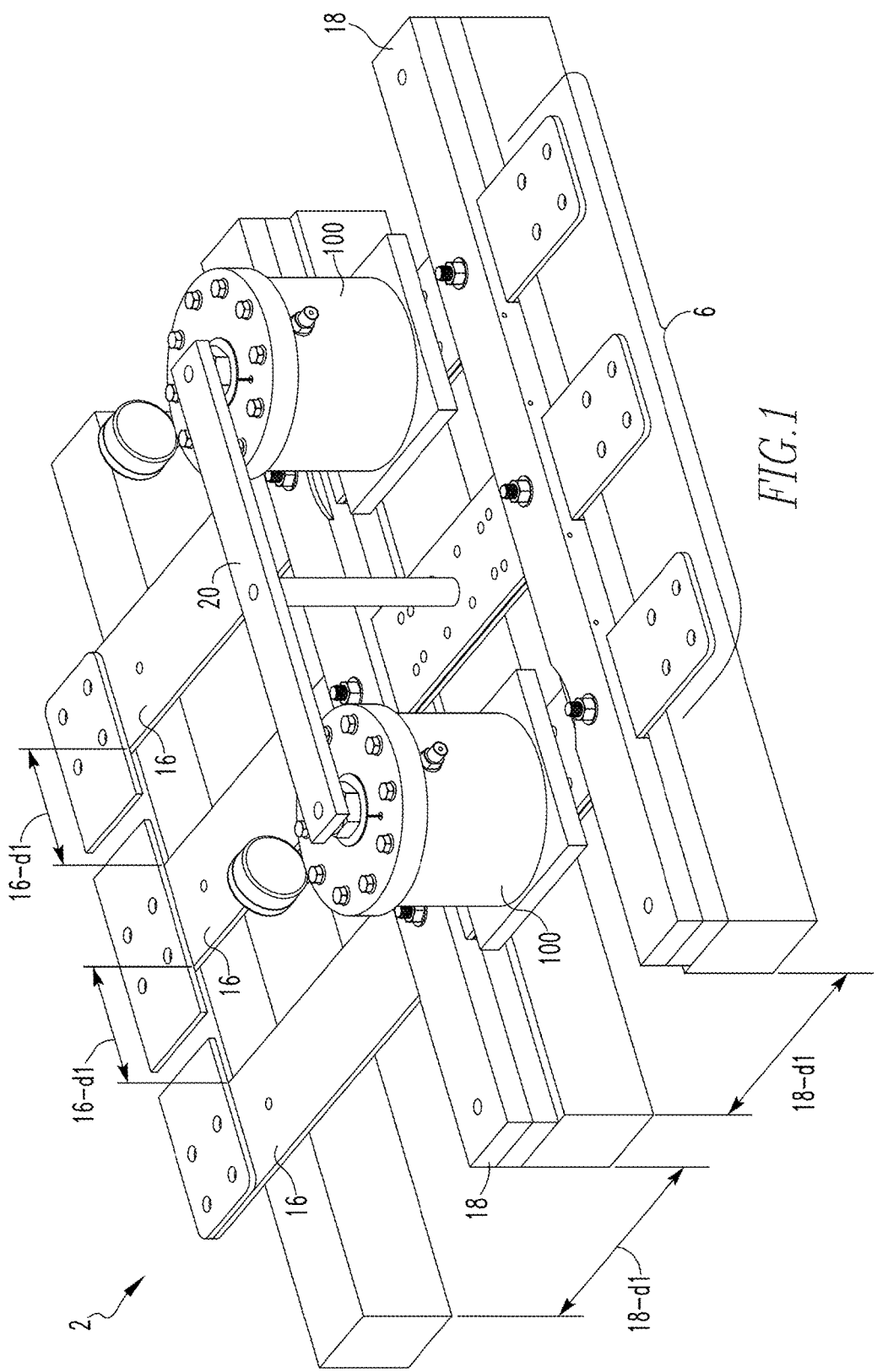
FIG. 1 is an illustrative embodiment of a low voltage power system 2 in accordance with an embodiment of the disclosed concept.

FIG. 1 is an exemplary, non-limiting, embodiment of a low voltage power system 2 in accordance with an embodiment of the disclosed concept. Low voltage power system 2 includes one or more low voltage arc flash mitigation switches 100 and a three-phase low voltage power bus bar setup 6. Low voltage arc flash mitigation switches 100, in the illustrated non-limiting exemplary embodiment, are vertical in design such that when used, debris falls with gravity to an end of the switch. The exemplary three-phase low voltage power bus 6 includes three low voltage power bus bars 16, which may be supported by one or more of support bars 18. Support bars 18, in one embodiment, are formed from an insulating material including, but not limited to, GP03 and glass filled epoxy resin.

The three low voltage power bus bars 16 carry a three-phase low voltage current (e.g., alternating, direct), which may couple to arc flash mitigation switches 100. Low voltage power bus bars 16 are arranged parallel to one another and separated by a distance 16-$d1$. Support bars 18 may, in one embodiment, be evenly spaced, by a distance 18-$d1$, and may connect in a crisscross pattern with low voltage power bus bars 16 at various points. In one exemplary embodiment, one of low voltage arc flash mitigation switches 100 reside on one low voltage power bus bars 16 in a portion of the low voltage power bus bar 16 between two of support bars 18. However, persons of ordinary skill in the art will recognize that this configuration is merely exemplary, and additional configurations may be used (e.g., see FIGS. 20 and 21). Furthermore, persons of ordinary skill in the art will recognize, however, that although low voltage power system 2 carries a three-phase low voltage current across low voltage power bus bars 16, this is merely exemplary, and a medium or high voltage current may be used.

In one embodiment, a support member 20 provides a common electrical connection between each of low voltage arc flash mitigation switches 100 and one of the three phase low voltage power bus bars 16. For example, a first electrical contact (e.g., a positive contact) of each of low voltage arc flash mitigation switches 100 may be commonly connected to a middle low voltage power bus bar 16 via support member 20. Support member 20, in one embodiment, may be substantially "T"-shaped such that an upper horizontal portion connects at either end to a top portion of each of low voltage arc flash mitigation switches 100, and a lower vertical portion connects to a midpoint of the upper horizontal portion and the low voltage power bus bar 16.

Figure 2:
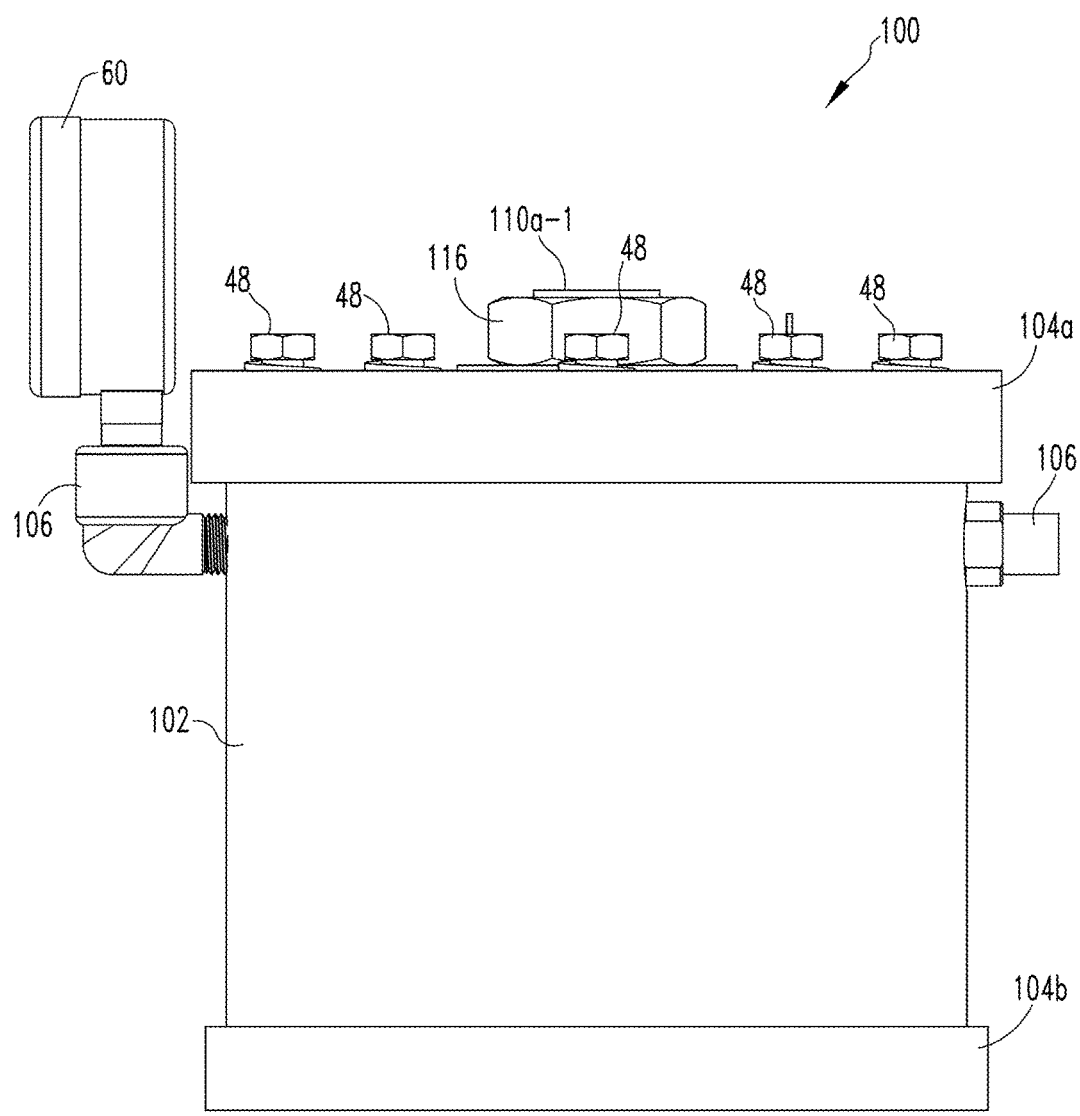
FIG. 2 is an illustrative side view of an arc flash mitigation switch 100 as illustrated in FIG. 1 in accordance with an embodiment of the disclosed concept.
Figure 3:
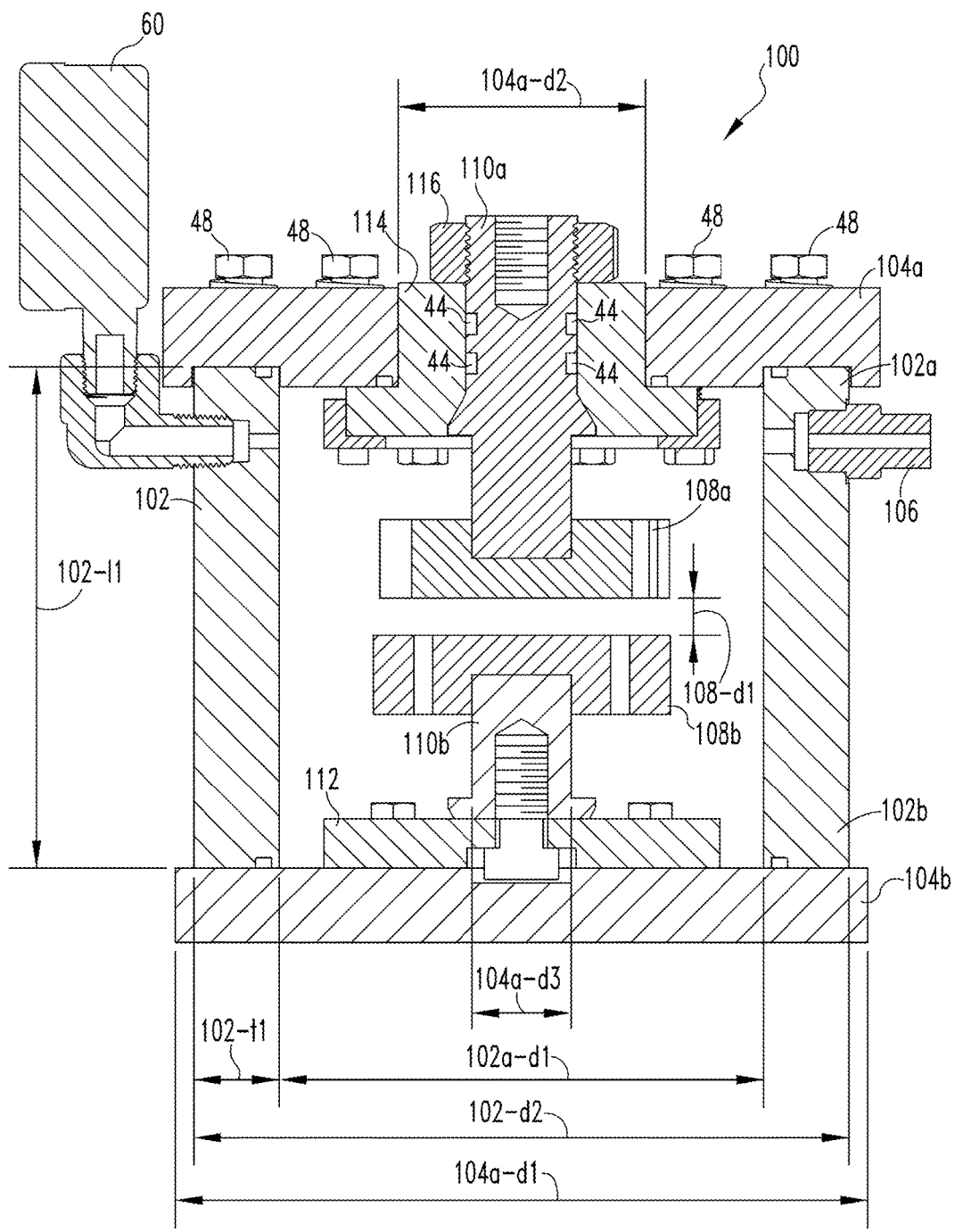
FIGS. 3 and 4 are illustrative side cross-sectional views of arc flash mitigation switch 100 of FIGS. 1 and 2 in accordance with an embodiment of the disclosed concept.
Figure 4:
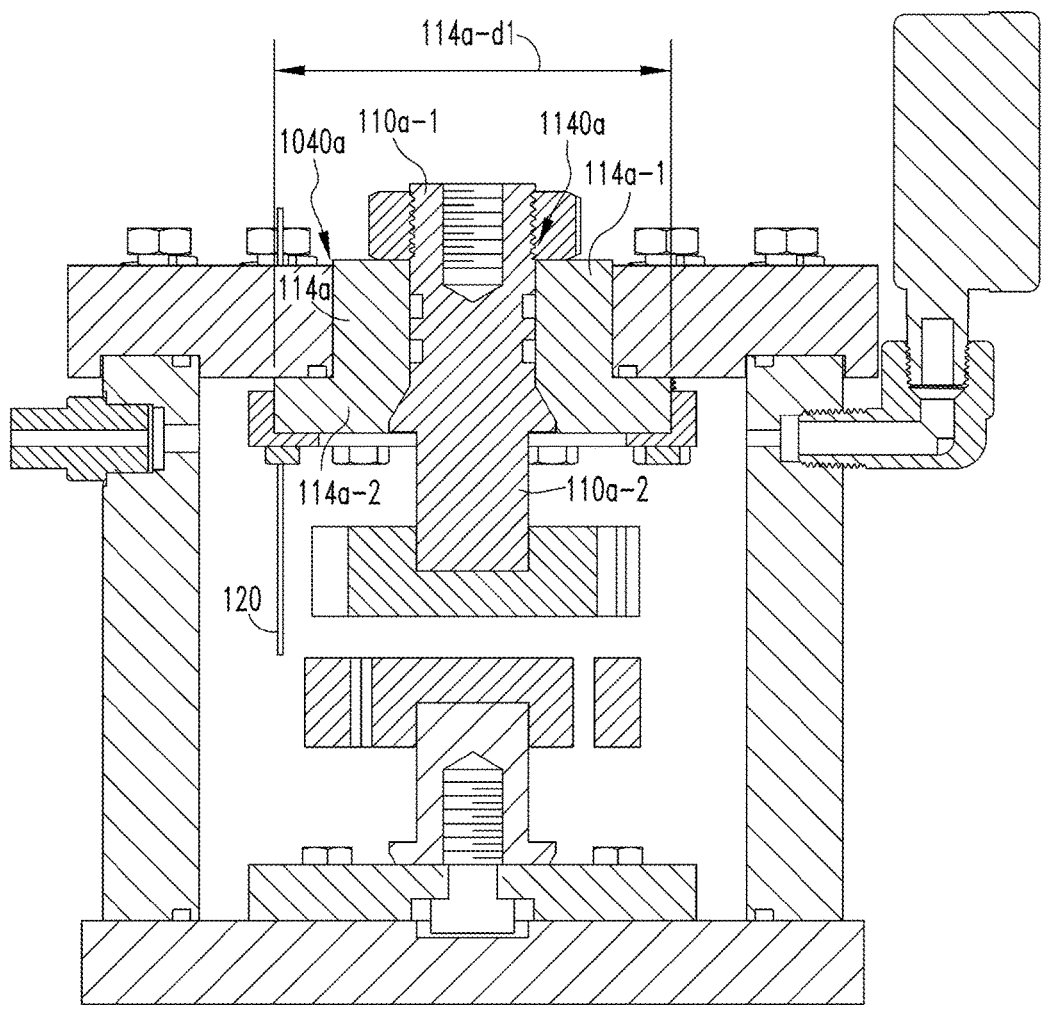

FIG. 2 is an illustrative side view of arc flash mitigation switch 100 as illustrated in FIG. 1 in accordance with an embodiment of the disclosed concept. FIGS. 3 and 4 are illustrative side cross-sectional views of arc flash mitigation switch 100 of FIGS. 1 and 2 in accordance with an embodiment of the disclosed concept. In the illustrated exemplary embodiments, arc flash mitigation switch 100 includes a cylindrical shell 102 which has a width 102-$t1$ that is substantially constant both annularly and along a length 102-$l1$ of cylindrical shell 102. Cylindrical shell 102 also, in one embodiment, has an outer diameter 102-$d1$ and an inner diameter 102-$d2$, the difference being equal to one half of width 102-$d1$. Width 102-$t1$ is any suitable width such that the arc flash event commutated by arc flash mitigation switch 100 does not burn or crack through cylindrical shell 102. For example, cylindrical shell 102 may be between 0.5 and 2 inches thick. Cylindrical shell 102, in one embodiment, is made of a low-conductive or non-conductive material, however in other embodiments, cylindrical shell 102 may be made of a conductive material. For example, cylindrical shell 102 may be made of stainless steel, however persons of ordinary skill in the art will recognize that one or more additional materials may be used instead. In one embodiment, one or more additional layers may line the inside walls or the outside walls of cylindrical shell 102, and the additional layers may be made of any suitable conductive or non-conductive material, and may be of any thickness or length.

In one embodiment, one or more ports 106 may be included within cylindrical shell 102. For example, a port 106 may connect to an inner cavity formed by cylindrical shell 102 at one end, while at the other end may be a pressure gauge 60. Pressure gauge 60 may be any device capable of measuring a pressure within the inner cavity such that a user can read pressure gauge 60 to know whether or not arc flash mitigation switch is safe to interact with. For example, while mitigating an arc flash, the internal pressure of arc flash mitigation switch 100 may raise dramatically. Persons of ordinary skill in the art will recognize that any type of device may be attached to a corresponding port 106 including, but not limited to, a light sensor, a temperature gauge, a radiation sensor, or any combination thereof. Furthermore, any number of devices, and thus ports 106, may be included within arc flash mitigation switch 100. Still further, in at least one embodiment, no ports 106 may be included within arc flash mitigation switch 100, and the one or more ports previously described may be used only for test purposes.

Located at a first end 102$a$ of cylindrical shell 102 is a first end cap 104$a$ and located at a second end 102$b$ of cylindrical shell 102 opposite first end 102$a$ is second end cap 104$b$. In one embodiment, first end cap 104$a$ is substantially circular having an outer diameter 104$a$-$d1$. Proximate to the edge of first end cap 104$a$ are a plurality of bolts 48 operable to secure first end cap 104$a$ to cylindrical shell 102 such that a substantially fluid seal is created at the junction of first end cap 104$a$ and cylindrical shell 102. In one embodiment, first end cap 104$a$ also includes a first opening 1040$a$ as seen in FIG. 4, having a diameter 104$a$-$d2$.

Opening 1040$a$ of first end cap 104$a$ is operable to allow a first sealing member 114 to extend there through. First sealing member 114, in one embodiment, is made of a non-conductive material, such as ceramic or an epoxy resin including fiberglass, and forms a fluid seal with first end cap 104$a$. In one embodiment, first sealing member 104$a$ includes a shaft 114$a$-1 that extends through first end cap 104$a$. First sealing member 104$a$ also includes a base 114$a$-2 that is substantially circular and resides within the inner cavity of cylindrical shell 102 such that a first surface of the base 114$a$-2 of the first sealing member 104$a$ abuts an inner surface of first end cap 104$a$. In one embodiment, base 114$a$-2 of first sealing member 114 has a diameter 114-$d1$ which is smaller than inner diameter 102$a$-$d1$ of cylindrical shell 102, however this is merely exemplary, and diameter 114$a$-$d1$ may be any length equal to or less than inner diameter 102$a$-$d1$. Furthermore, located on first sealing member 114, in one embodiment, are axial and face sealing O-rings 44 that aid in creating a fluid seal between first sealing member 114 and first end 104$a$.

Shaft 114$a$-1 of first sealing member 114 extends from the from the first surface of base 114$a$-2 through opening 1040$a$ of first end cap 104$a$. In one embodiment, shaft 114$a$-1 of first sealing member 114 has an outer diameter substantially equal to diameter 104$a$-$d2$ of first end cap 104$a$ such that substantially fluid seal is created there between. In one embodiment, shaft 114$a$-1 of first sealing member 114 includes an opening 1140$a$ having a diameter 104-$d3$.

Extending through opening 1140$a$ of first sealing member 114 is a first conductive feed through 110$a$. First conductive feed 110$a$ through is, in one embodiment, a substantially elongated tube having a diameter that is substantially similar to diameter 104-$d3$ such that a substantially fluid seal is created between conductive feed through 110$a$ and first sealing member 114. First conductive feed through 110$a$ extends through first sealing member 114 such that a first end 110$a$-1 of first conductive feed through 110$a$ is capable of being secured to a top portion of first sealing member 114 outside of first end cap 104$a$ with a nut 116. At a second end 110$a$-2, first conductive feed through 110$a$ is attached to a first electrode 108$a$. In one embodiment, one or more sealing O-rings 44 are placed along a length of first conductive feed through 110$a$ to aid in creating a seal between first conductive feed through 110$a$ and first sealing member 114.

Second end cap 104$b$, in the illustrated embodiment, is solid and does not include any openings. In one embodiment, second end cap 104$b$ is made of a conductive material such that it electrically couples to one of low voltage power bus bars 16. However, persons of ordinary skill in the art will recognize that second end cap 104$b$, in one embodiment, may be substantially similar to first end cap 104$a$.

Coupled to an inner surface of second end cap 104$b$ is a second conductive feed through 110$b$. Second conductive feed through 110$b$, in the illustrated embodiment of FIGS. 2-4, is substantially similar to first conductive feed through 110$a$, with the exception that the former does not extend through second end cap 104$b$ and connects with the inner surface of second end cap 104$b$. Second conductive feed through 110$b$ also couples to a second electrode 108$b$ at an end opposite a base portion 112.

Each of first and second conductive feed throughs 110$a$, 110$b$ couple at one end to first electrode 108$a$ and second electrode 108$b$, respectively, and at another end to one of the low voltage power bus bars 16. For example, referring back to FIG. 1, second end cap 104$b$ couples to low voltage power bus bars 16 at an A or C phase, which in turn couples to second conductive feed through 110$b$ and second electrode 108$b$. First electrode 108$a$, in one embodiment, couples to first conductive feed through 110$a$, which couples to support member 20, which is electrically coupled to low voltage power bus bar 16 at a B phase.

First and second electrodes 108$a$ and 108$b$ are, in the illustrated exemplary embodiment, centrally located within cylindrical shell 102 of arc flash mitigation switch 100. A gap 108-$d1$ exists between first and second electrodes 108$a$ and 108$b$ which facilitates external arc flash events to commutate across first and second electrodes 108a and 108b, and thus quench the external arc flash. Typically, there is a first voltage running across gap 108-d1 between first electrode 108a and second electrode 108b of approximately 480 $V_{RMS}$, however this value is merely exemplary. In one exemplary embodiment, the first and second electrodes 108a and 108b are made of Elkonite™, which is a material composed of tungsten and copper. These materials may be used because copper is ductile and a good electrical conductor and tungsten has a very high melting point and is a good thermionic emitter, which helps ensure that the arc flash event inside arc flash mitigation switch 100 does not extinguish near O-rings 44 and ensures that the arc remains between electrodes 108a and 108b, for example. Gap 108-d1 may be of any suitable size, and may change depending on the materials used to design arc flash mitigation switch 100, the expected arc flash event voltage, or any other criteria. In one exemplary embodiment, gap 108-d1 is approximately ⅜ of an inch, however this value may vary accordingly. A more detailed discussion of first and second electrodes is described below (e.g., see FIG. 16).

In one embodiment, arc flash switch 100 includes a trigger feed through 120. Trigger feed through 120 extends through first end cap 104a and connects outside of arc flash mitigation switch 100 to an arc flash trigger switch (e.g., arc flash trigger circuit 1000 of FIG. 18), which is described in greater detail below. Trigger feed through 120 extends through a portion of the inner cavity of cylindrical shell 102 and connects to a ribbon attached to an inner surface of first electrode 108a. Trigger feed through 120, in one embodiment, is an electromagnetic trigger wire made of a conductive material, such as copper. The trigger feed through 120 connects to a ribbon or wire 122 that is fastened to one of the electrodes, for example first electrode 108a. When triggered, ribbon 122 bends to touch electrode 108b, which "closes the switch". The ribbon portion of trigger feed through 120, and trigger feed through 120 are described in greater detail below with reference to FIG. 5.

Arc fault mitigation switch 100, in the illustrated exemplary embodiment, is an enclosed system that allows an external arc fault occurring outside the system to be commutated into arc flash mitigation switch 100 thereby eliminating the external arc fault. In one non-limiting exemplary embodiment, in response to an external arc fault event, triggering feed through 120 places a current pulse in ribbon 122 that creates a magnetic repulsion force between ribbon 122 and electrode 108a causing ribbon 122 to break at its mid-point. The momentum of ribbon 122 breaking thus causes ribbon 122 to strike electrode 108b, creating an arc across gap 108-d1 within sealed arc flash mitigation switch 100. When the arc fault is commutated to the first and second electrodes 108a and 108b, the ribbon portion of trigger feed through 120 vaporizes, creating a plasma gas which allows the arc fault to be quenched inside cylindrical shell 102 of arc flash mitigation switch 100. The arc flash is advantageously commutated in under approximately 2 ms, eliminating the arc flash hazard. The fault currents (e.g., 10-100 kA), in one embodiment, are capable of being contained by first and second electrodes 108a, 108b within cylindrical shell 102 for approximately 30 cycles at 60 Hz, providing a substantial current reduction (e.g., approximately 25%). A more detailed explanation is described in commonly assigned U.S. patent application Ser. No. 14/181,929, filed on Feb. 18, 2014, which is incorporated herein by reference in its entirety.

Figure 5:
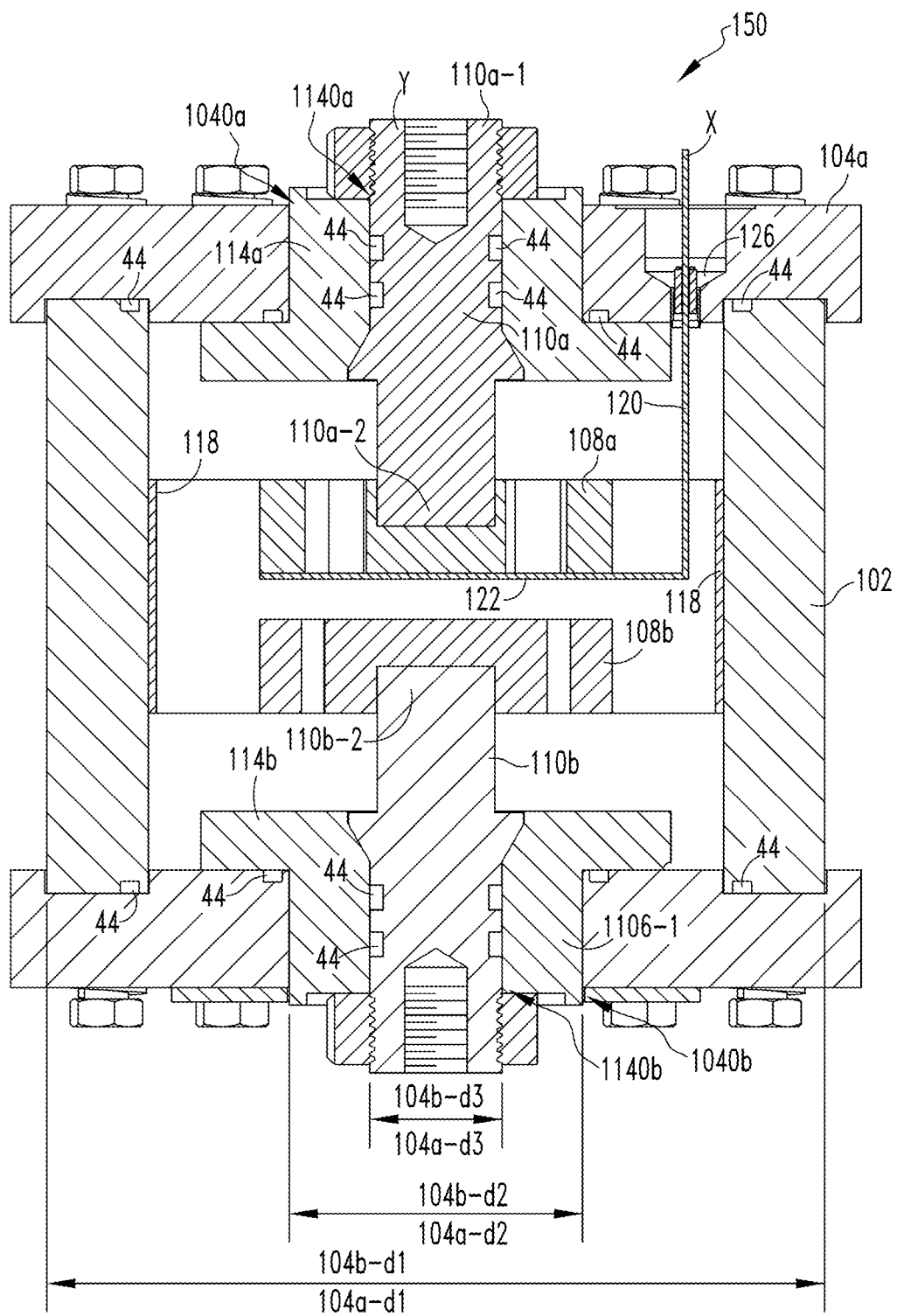
FIG. 5 is another illustrative diagram of an arc flash mitigation switch 150 in accordance with an embodiment of the disclosed concept.

FIG. 5 is another illustrative diagram of an arc flash mitigation switch 150 in accordance with an embodiment of the disclosed concept. Arc flash mitigation switch 150 is, in one embodiment, substantially similar to arc flash mitigation switch 100 of FIGS. 2-4, with the exception that first end cap 104a and second end cap 104b are substantially similar. For example, first end cap 104a includes an opening 1040a having a diameter 104a-d2, with which first sealing member 114a protrudes through. First sealing member 114a, in the illustrated embodiment, includes an opening 1140a having a diameter 104a-d3, with which a first conductive feed through 110a protrudes through and connects to one of low voltage power bus bars 16 (e.g., an A-phase or a C-phase). Arc flash mitigation switch 150 also includes second end cap 104b which is substantially similar to first end cap 104a, including an opening 1040b having a diameter 104b-d2, which is substantially similar to diameter 104a-d2, with which a second sealing member 114b protrudes through. Second sealing member 114b, in the illustrated embodiment, further includes an opening 1140b having a diameter 104b-d3, with which a second conductive feed through 110b protrudes through and connects to one of low voltage bus bars 16 (e.g., a B-phase).

In one embodiment, both first sealing member 114a and second sealing member 114b are made of a non-conductive material, such as ceramic or an epoxy resin including fiberglass. Persons of ordinary skill in the art will recognize that first and second sealing members 114a and 114b may be made of any suitable material so long as they provide a fluid seal between end caps 104a, 104b and conductive feed throughs 110a, 110b, as well as being able to maintain substantially high heat and pressure loads. For example, ceramic is often used within kilns and is capable withstanding high heats without burning or cracking.

Arc flash mitigation switch 150 also includes trigger sealing member 126, which, in one embodiment, is located on first end cap 104a. Trigger sealing member 126 may extend through first end cap 104a such that trigger feed through 120 is capable of extending from outside arc flash mitigation switch 150 to the inner cavity formed by cylindrical shell 102. Trigger sealing member 126, in one embodiment, may be formed of a material substantially similar to that of first and second sealing members 114a, 114b so long as a fluid seal is formed between trigger sealing member 126 and first end cap 104a. Persons of ordinary skill in the art will recognize that trigger sealing member 126 may, in some embodiments, be located on second end cap 104b instead of first end cap 104a, or it may even be located on a portion of cylindrical shell 102 such that trigger feed through 120 is operable to extend through wall thickness 10241 of cylindrical shell 102, and trigger sealing member 126 being located on first end cap 104a is merely exemplary.

Arc flash mitigation switch 150 also, in one non-limiting exemplary embodiment, includes liner 118, which may be annular about a portion of an inner surface of cylindrical shell 102. For example, liner 118 may be substantially the same length along the longitudinal axis as electrodes 108a and 108b including gap 108-d1. This may be because when the arc flash event commutates into arc flash mitigation switch 150, the shape of electrodes 108a, 108b (see FIG. 16) causes the arc to rotate within cylindrical shell 102 and spin about electrodes 108a, 108b. The rotating arc will distribute heat from the arc across the inner surface of cylindrical shell 102 causing the material to erode. Liner 118 aids in minimizing extraneous erosion so that the rotating arc does not burn through cylindrical shell 102 before the arc flash is fully quenched.

Figure 6:
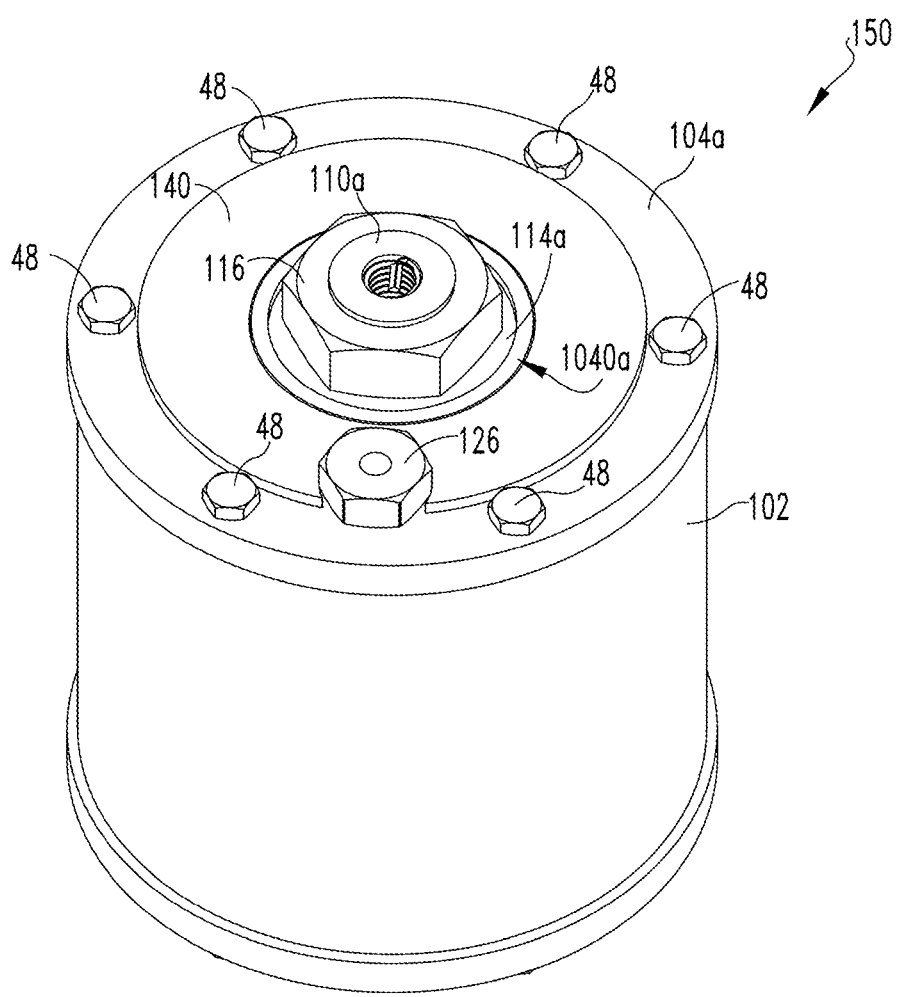
FIG. 6 is an illustrative diagram of an isotropic view of arc flash mitigation switch 150 of FIG. 5 in accordance with an embodiment of the disclosed concept.

FIG. 6 is an illustrative diagram of an isotropic view of arc flash mitigation switch 150 of FIG. 5 in accordance with an embodiment of the disclosed concept. Arc flash mitigation switch 150 includes non-conductive ring 140 located on an exterior surface of first end cap 104a of arc flash mitigation switch 150. Non-conductive ring 140, in one non-limiting embodiment, reside on the exterior surface of first end cap 104a between the edge of first end cap 104a and opening 1140a. However, persons of ordinary skill in the art will recognize that non-conductive ring 140 may occupy any portion of the exterior surface of first end cap 104a, and the illustrated example is not to be construed as limiting. Furthermore, in one embodiment, non-conductive ring 140 may also be found on an exterior surface of second end cap 104b of arc flash mitigation switch 150, and may be substantially similar to non-conductive ring 140 found on the exterior surface of first end cap 104a.

Non-conductive ring 140, in one embodiment, inhibits any electrical arcing to occur between first conductive feed through 110 and bolts 48 lining the perimeter of first end cap 104a or any other exposed conductive surface proximate to first conductive feed through 110. This way, no additional external hazard will arise in response to arc flash mitigation switch 150 attempting to quench an external arc fault present in the switchgear. Persons of ordinary skill in the art will further recognize that non-conductive ring 140 is capable of being used with any arc flash mitigation switch, such as arc flash mitigation switch 100 of FIGS. 1-4, and the aforementioned description relating to arc flash mitigation switch 150 is merely exemplary.

Figure 7:
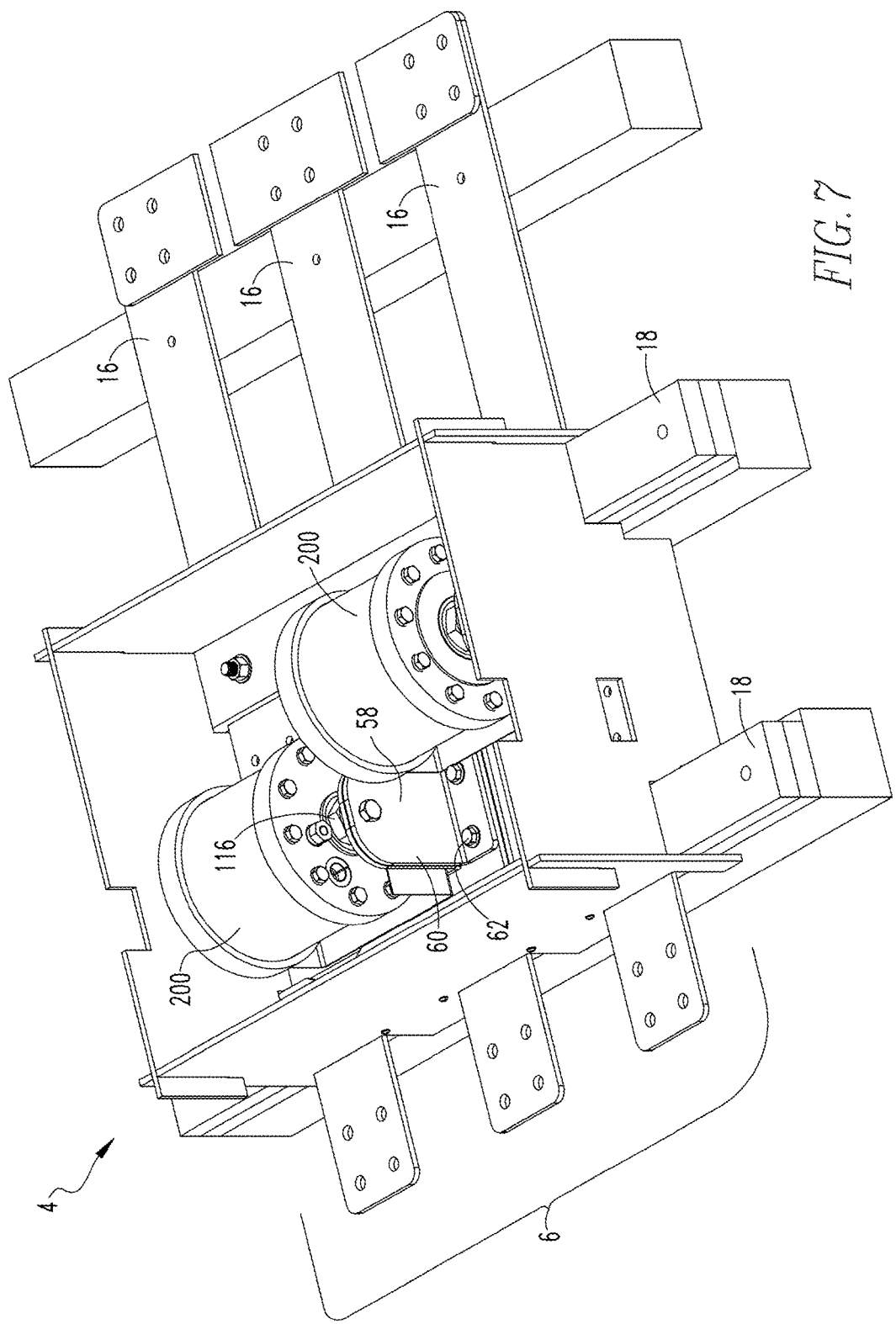
FIG. 7 is an exemplary, non-limiting, embodiment of a low voltage power system 4 in accordance with an embodiment of the disclosed concept.

FIG. 7 is an exemplary, non-limiting, embodiment of a low voltage power system 4 in accordance with an embodiment of the disclosed concept. Low voltage power system 4 includes low voltage power bus bars 16 and support bars 18, which support one or more arc flash mitigation switches 200. Arc flash mitigation switches 200, in the illustrated non-limiting exemplary embodiment, are horizontal in design, such that, when used, debris falls with gravity towards an inner portion of cylindrical shell 102. Persons of ordinary skill in the art will also recognize that although system 4 is described as "low voltage", a medium or high voltage system may be used instead.

In one exemplary embodiment, first end 104a of one of arc flash mitigation switches 200 couples to one of low voltage power bus bars 16 (e.g., an "A"-phase or a "C"-phase) via a conductive bracket 58. Conductive bracket 58 is shaped such that a first portion 60 couples to first end cap 104a of arc flash mitigation switch 200 via nut 116, and a second portion 62 of conductive bracket 58 couples to low voltage power bus bars 16. Second end cap 104b of arc flash mitigation switch 200 couples to one of low voltage power bus bars 16 (e.g., a "B"-phase) via conductive bracket 58, such that first portion 60 couples to second cap 104b via nut 116, and second portion 62 couples to low voltage power bus bars 16.

Low voltage power system 4 is configured, in the illustrated exemplary embodiment, such that a common end of both of arc flash mitigation switches 200 couple to a same low voltage power bus bar 16 (e.g., "B"-phase) and the first end of each of arc flash mitigation switches 200 couple to one of low voltage power bus bars 16 (e.g., "A"-phase or "C"-phase), such that a complete electrical connection is formed. In one embodiment, low voltage power system 4 includes two arc flash mitigation switches which are slightly offset from one another, however this is merely exemplary.

Figure 8:
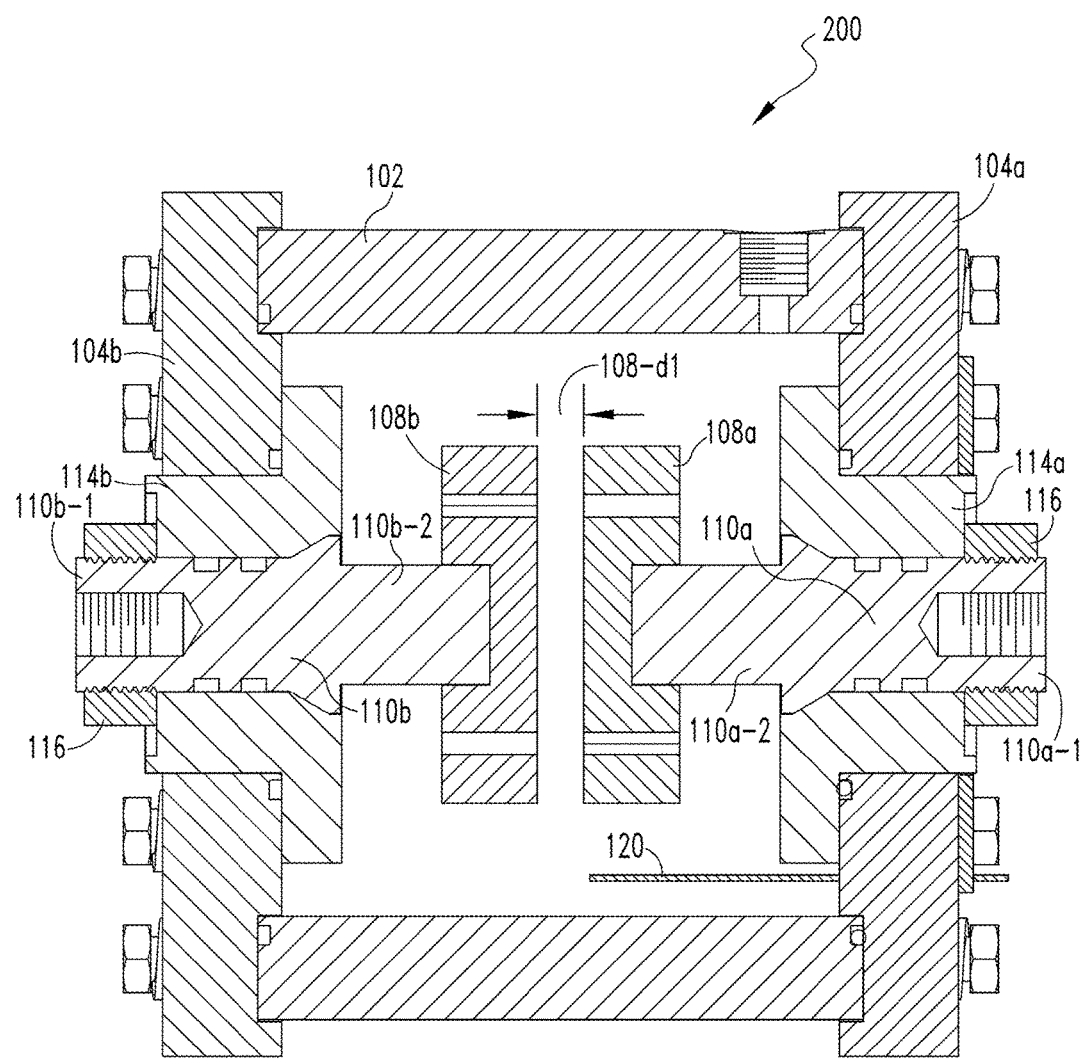
FIGS. 8 and 9 are illustrative diagrams of an arc flash mitigation switch 200 of FIG. 7 in accordance with an embodiment of the disclosed concept.
Figure 9:
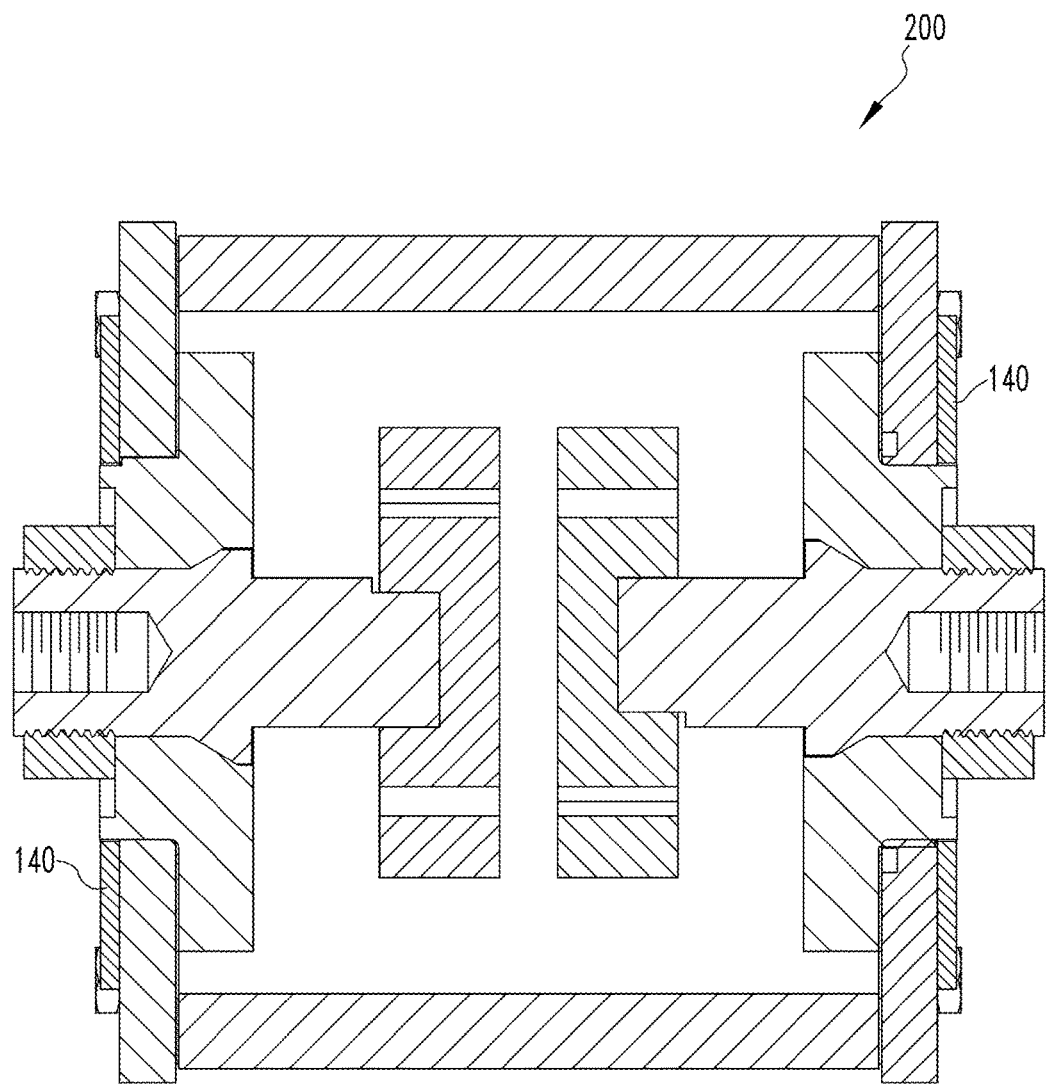

FIGS. 8 and 9 are illustrative diagrams of arc flash mitigation switch 200 of FIG. 7 in accordance with an embodiment of the disclosed concept. Arc flash mitigation switch 200 of FIG. 9, for example, may also be substantially similar to arc flash mitigation switch 200 of FIG. 8, with the exception that the former includes non-conductive ring 140 on an exterior surface of first and/or second end caps 104a, 104b. Furthermore, in one embodiment, arc flash mitigation switch 200 may include a solid end cap, such as second end cap 104b of FIG. 3, instead of a symmetrical first end cap 104a and second end cap 104b (and thus a symmetrical first and second sealing member 114a, 114b, and a symmetrical first and second conductive feed through 110a, 110b).

Figure 10:
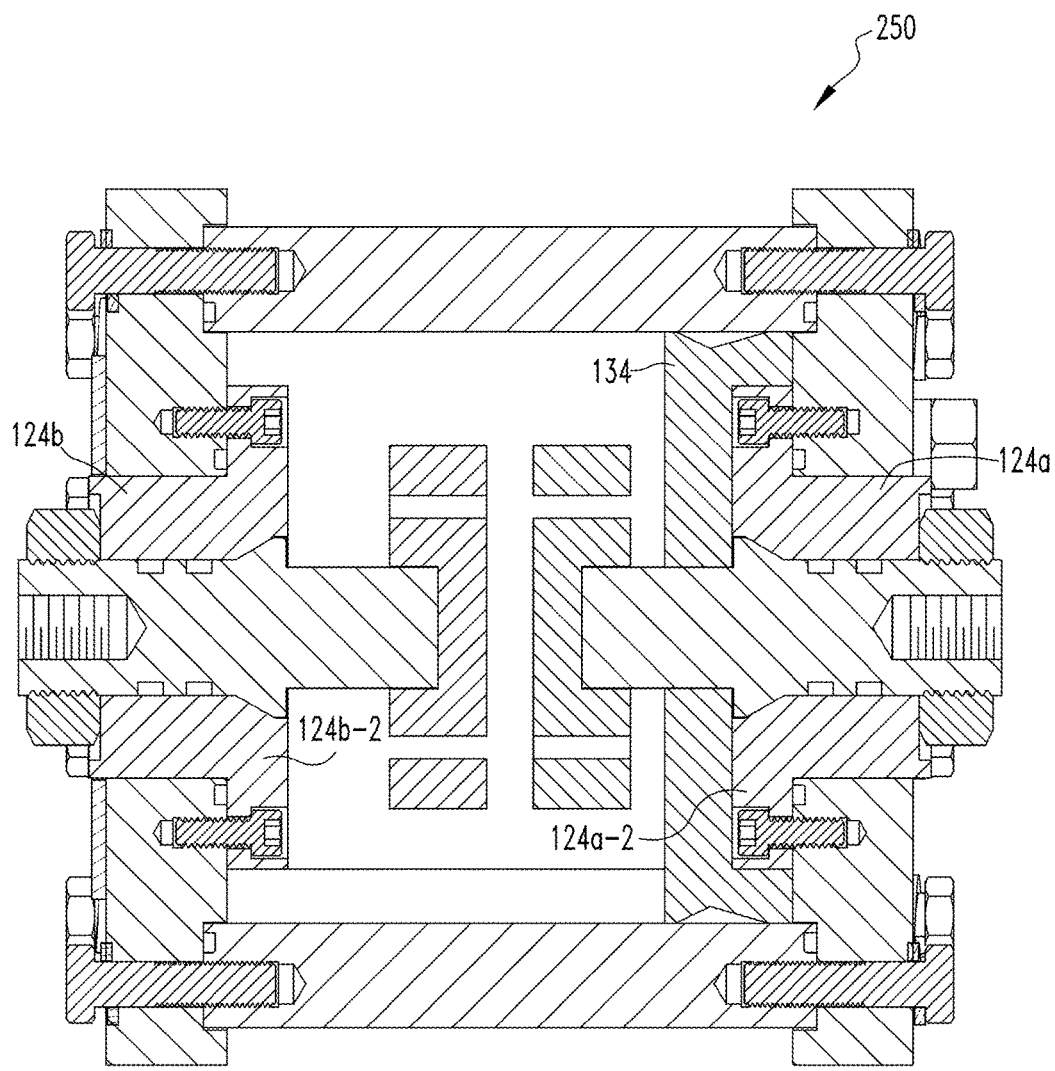
FIG. 10 is an illustrative diagram of an arc flash mitigation switch 250 in accordance with an embodiment of the disclosed concept.

FIG. 10 is an illustrative diagram of arc flash mitigation switch 250 in accordance with an embodiment of the disclosed concept. Arc flash mitigation switch 250, in the illustrated exemplary embodiment, is substantially similar to arc flash mitigation switch of FIG. 8 with the exception that the former includes a first insulating member 124a and a second insulating member 124b. In addition to including first and second insulating members 124a and 124b, arc flash mitigation switch 250, in one embodiment, includes non-conductive plate 134. Non-conductive plate 134 is, in one embodiment, made of a heat resistant material, such as ceramic, and is capable of securing first and/or second insulating member 124a, 124b such that they are capable of withstanding the heat load associated with an arc flash event.

First and second insulating members 124a and 124b, in one embodiment, are substantially similar to first and second sealing member 114a and 114b with the exception that, in the illustrated exemplary embodiment, they may be formed of a different material than non-conductive plate 134. For example, if non-conductive plate 134 is made of ceramic, first and second insulator members 124a and 124b may be made of an epoxy resin including fiberglass. However persons of ordinary skill in the art will recognize that any suitable material may be used, and the aforementioned are merely exemplary.

In one embodiment, non-conductive plate 134 may be located about both first and second insulating members 124a and 124b such that non-conductive plate 134 will protect first and second insulating members 124a and 124b. For example, first end 102a and second end 102b of cylindrical shell 102 of arc flash switch 200 may include non-conductive plate 134. In one embodiment, non-conductive plate 134 is substantially circular in design and may abut an inner surface of end caps 104a, 104b and/or an inner surface of a base portion 124a-2, 124b-2 of insulating member's 124a, 124b.

Figure 11:
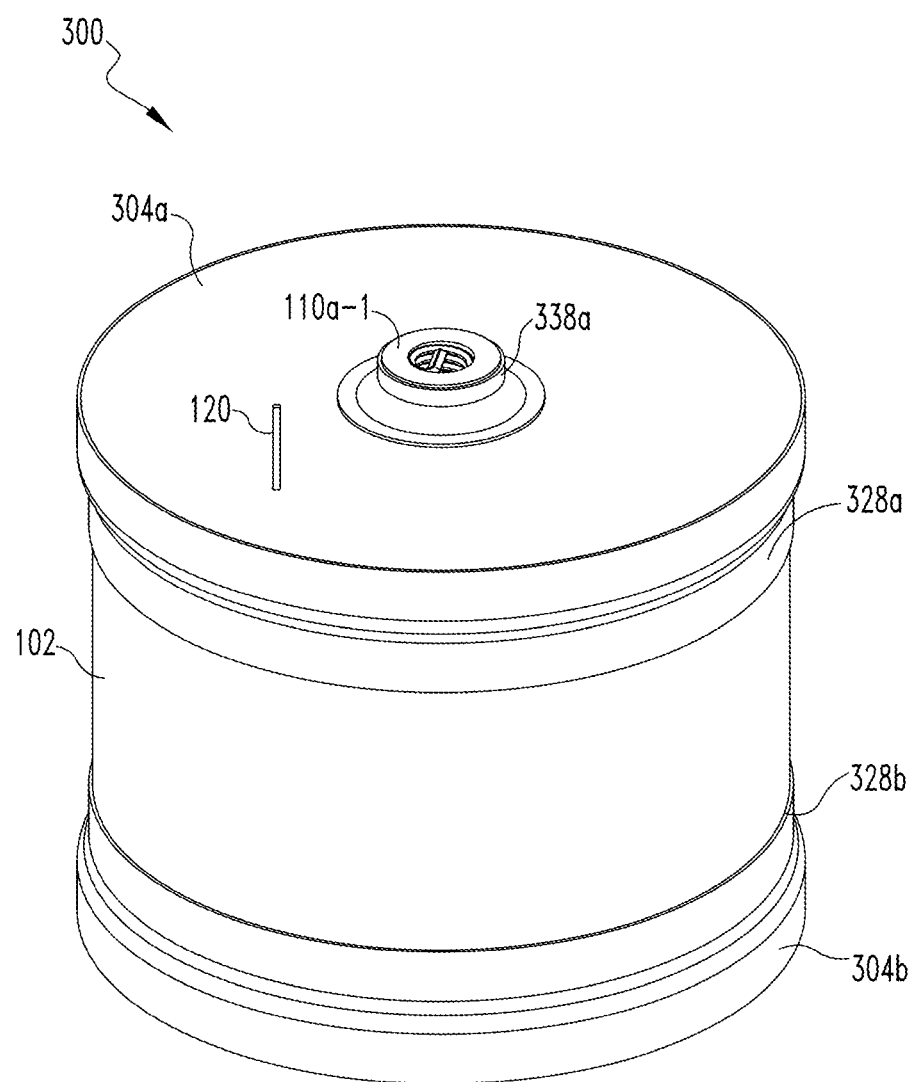
FIG. 11 is an illustrative diagram of an isotropic view of an arc flash mitigation switch 300 in accordance with an embodiment of the disclosed concept.
Figure 12:
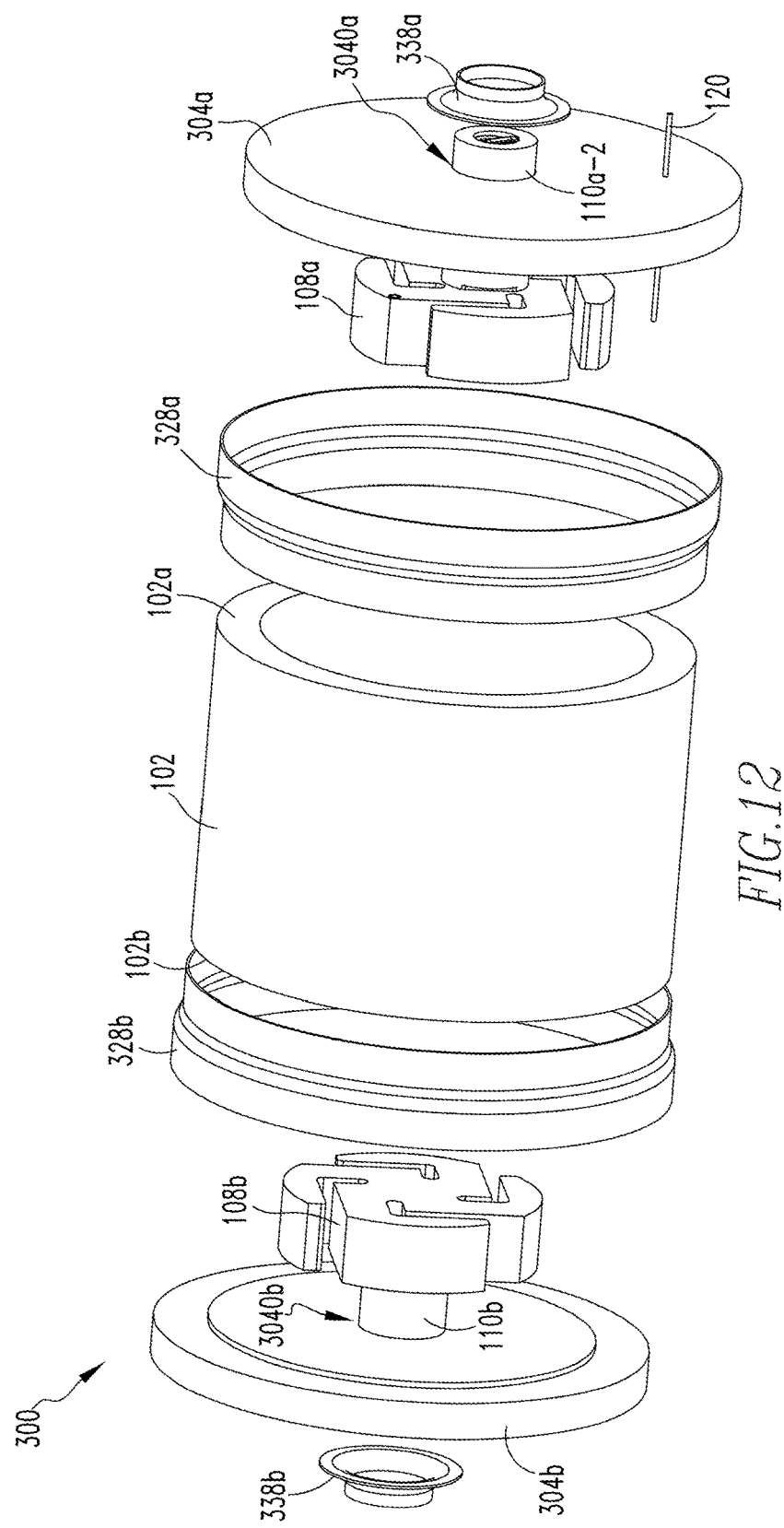
FIG. 12 is an illustrative diagram of a exploded component view of arc flash mitigation switch 300 in accordance with an embodiment of the disclosed concept.
Figure 13:
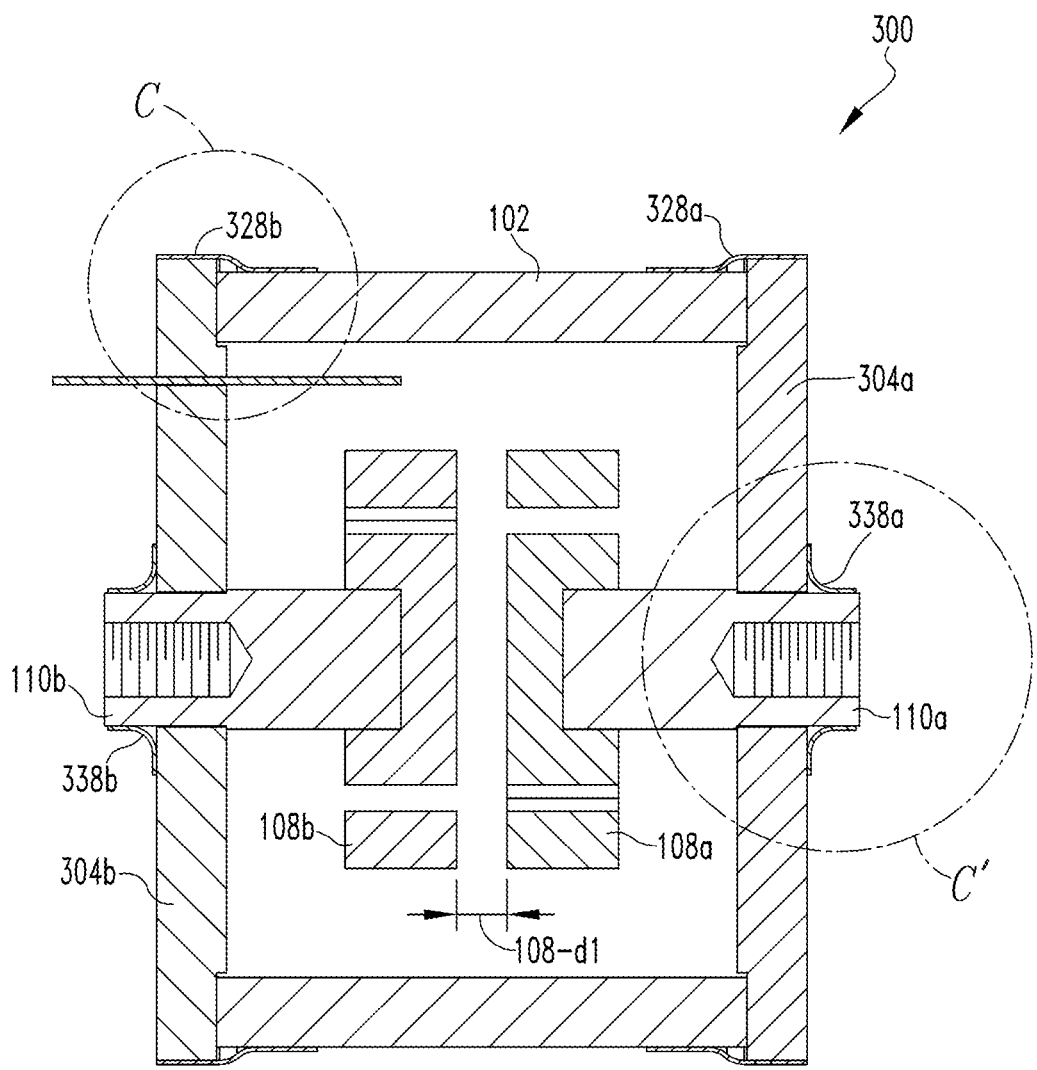
FIG. 13 is an illustrative diagram of a cross-section view of arc flash mitigation switch 300 horizontally oriented in accordance with an embodiment of the disclosed concept.

FIG. 11 is an illustrative diagram of an isotropic view of an arc flash mitigation switch 300 in accordance with an embodiment of the disclosed concept. FIG. 12 is an illustrative diagram of a exploded component view of arc flash mitigation switch 300 in accordance with an embodiment of the disclosed concept. FIG. 13 is an illustrative diagram of a cross-section view of arc flash mitigation switch 300 horizontally oriented in accordance with an embodiment of the disclosed concept.

Arc flash mitigation switch 300 is substantially similar to arc flash mitigation switches 100, 150, 200, and 250, with the exception that arc flash mitigation switch 300 includes first non-conductive end cap 304a and second non-conductive end cap 304b. First non-conductive end cap 304a is, in one embodiment, brazed to first end 102a of cylindrical shell 102 using first brazing member 328a, while second non-conductive end cap 304b is brazed to second end 102b of cylindrical shell 102 using second brazing member 328b. First and second brazing members 328a, 328b are made, for example out of a substantially non-conductive material such as stainless steel, however any non-conductive material may be used. For example, first and second brazing members 328*a*, 328*b* may be made out of Covar, which is commonly used in brazing scenarios due to its expansion properties to braze ceramics, however persons of ordinary skill in the art will recognize that other materials may be used.

First and second non-conductive end caps 304*a*, 304*b* each advantageously include one opening 3040*a* and 3040*b*, respectively, with which first and second conductive feed throughs 110*a*, 110*b* protrude through. However, in one embodiment, first non-conductive end cap 304*a* also includes an additional opening with which trigger feed through 120 extends through. Conductive feed throughs 110*a*, 110*b* are connected to first and second non-conductive end caps via a first and second brazing member 338*a* and 338*b*. Brazing members 328*a*, 328*b*, 338*a*, and 338*b* each create a fluid seal such that arc flash mitigation switch 300 is sealed and any potential heat, gas, or radiation transfer is minimized or eliminated and are important for successful brazing.

Arc flash mitigation switch 300 is formed similarly to arc flash mitigation switches 100, 150, 200, and 250, with the exception that first and second end caps 304*a* and 304*b* are secured to cylindrical shell 102 using brazing members 328*a* and 328*b*, while conductive feed throughs 110*a* and 110*b* are secured to first and second non-conductive end caps 304*a* and 304*b* via brazing members 338*a* and 338*b*. After the parts are all placed together, a vacuum pump or heat seal is used such that the corresponding parts are secured together. For example, first non-conductive end cap 304 is placed on first end 102*a* of cylindrical shell 102, and then first brazing member 328*a* is placed thereon such that a portion of first brazing member 328*a* surrounds the exterior side perimeter of first non-conductive end cap 304*a*, while another portion of first brazing member 328*a* surrounds an outer perimeter of cylindrical shell 102 about first end 102*a*. A similar procedure is employed for each of the other parts of arc flash mitigation switch that will be secured using brazing. Next, in one exemplary embodiment, air is pumped out of an inner cavity of cylindrical shell 102 such that first brazing member 328*a* fluidly secures first end cap 304*a* to cylindrical shell 102. As another example, instead of or in addition to pumping out air from the inner cavity of cylindrical shell 102, heat may be applied to arc flash mitigation switch 300 to shrink or contract first brazing member 328 (and any other brazing member), securing first non-conductive end cap 304*a* to cylindrical shell 102. Persons of ordinary skill in the art will recognize that any suitable technique may be used to braze two or more components together, and the aforementioned techniques are merely exemplary. For example, brazing may be performed in a vacuum environment. In some embodiments, the voltage application (e.g., low, medium, high-voltage), may factor into the brazing environment used. For example, for medium voltage applications, brazing may be performed in a vacuum environment, whereas for a low voltage application, brazing may be performed in a hydrogen atmosphere furnace.

Figure 22:
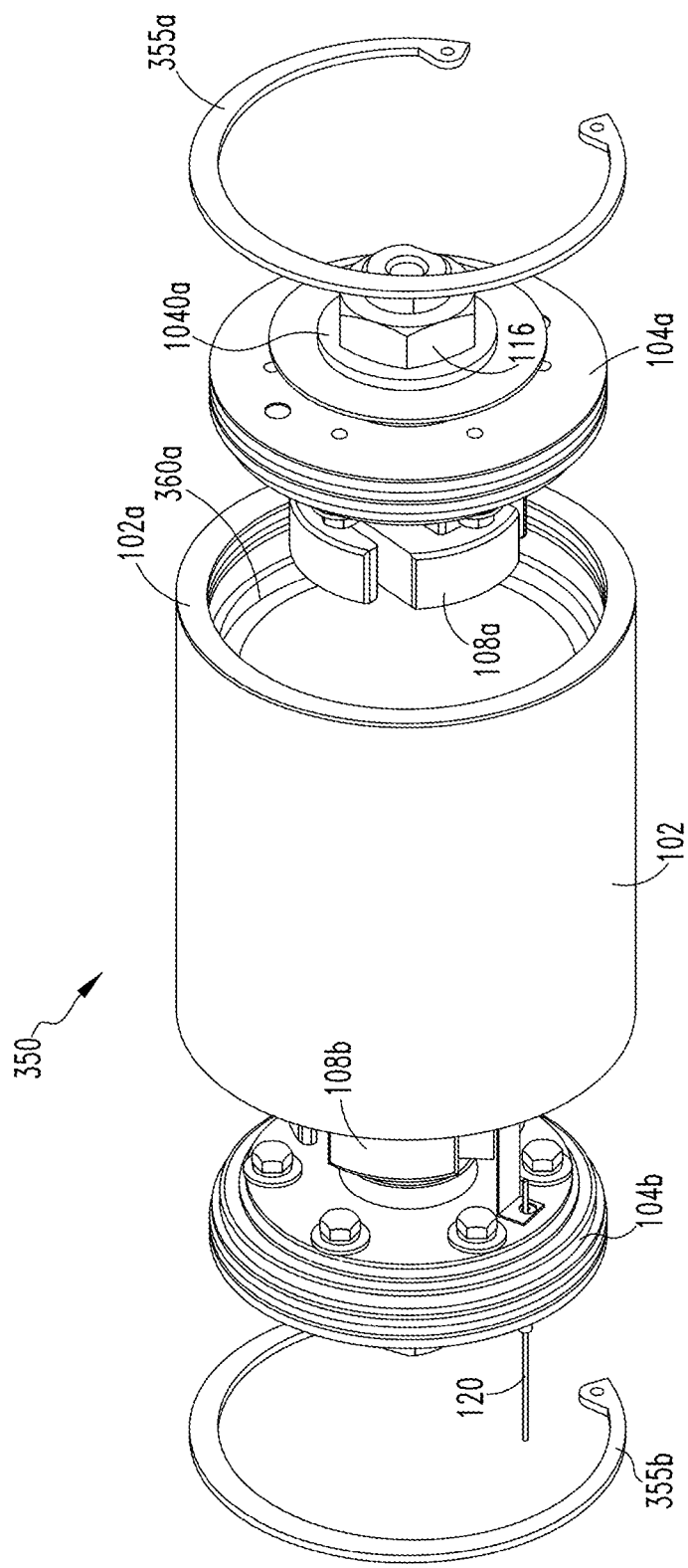
FIG. 22 is an illustrative diagram of a exploded component view of arc flash mitigation switch 350 in accordance with an embodiment of the disclosed concept.

FIG. 22 is an illustrative diagram of a exploded component view of an arc flash mitigation switch 350 in accordance with an embodiment of the disclosed concept. Arc flash mitigation switch 350 is substantially similar to arc flash mitigation switches 100, 150, 200, 250 and 300, with the exception that arc flash mitigation switch 350 includes first C-Clip 355*a* and second C-Clip 355*b*. First end cap 104*a*, in one embodiment, is pressure fit to first end 102*a* of cylindrical shell 102 using first C-Clip 355*a*, while second end cap 104*b* is pressure fit to second end 102*b* of cylindrical shell 102 using second C-Clip 355*b*. In an illustrative embodiment, first C-Clip 355*a* rests on lip 360*a*. Similar to first C-Clip 355*a*, but on the opposite side of cylinder 102, second C-Clip 355*b* rests on a lip on second end 102*b* of cylindrical shell 102. First and second C-Clips 355*a*, 355*b* are made, for example, out of a substantially non-conductive material such as stainless steel. However, a person of ordinary skill in the art would recognize that any non-conductive material may be used.

Arc flash mitigation switch 350 is formed similarly, in one embodiment to arc flash mitigation switches 100, 150, 200, 250, and 300, with the exception that arc flash mitigation switch 350 includes first and second C-Clips 355*a*, 355*b*. Furthermore, arc flash mitigation switch 350 is configured, in the illustrative embodiment, to operate in a similar manner as arc flash mitigation switches 100, 150, 200, 250, and 300, and the previous descriptions may apply.

Figure 14:
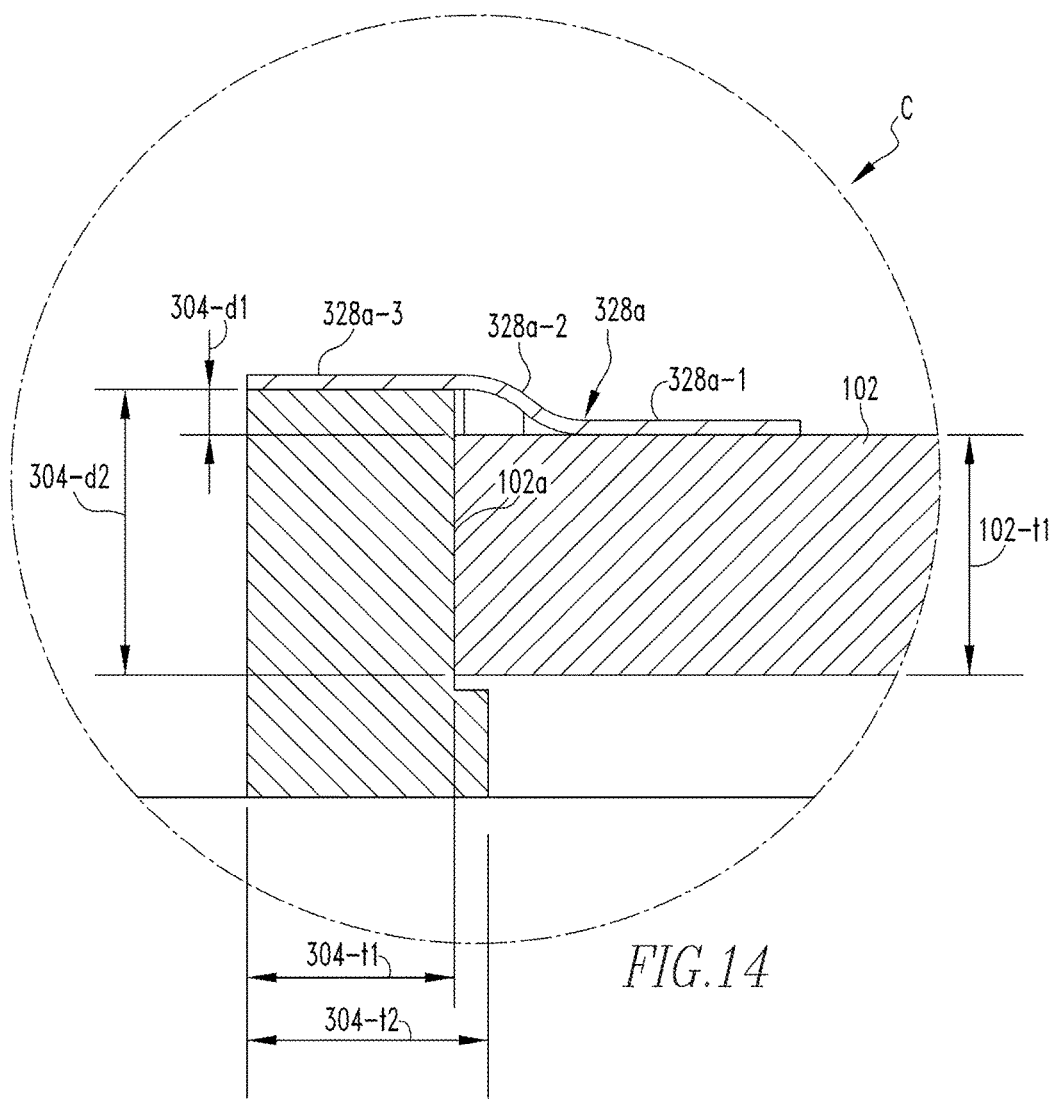
FIG. 14 is an illustrative diagram of a zoomed in portion C of arc flash mitigation switch 300 of FIG. 13 in accordance with an embodiment of the disclosed concept.

FIG. 14 is an illustrative diagram of a zoomed in portion C of arc flash mitigation switch 300 of FIG. 13 in accordance with an embodiment of the disclosed concept. In the non-limiting illustrative embodiment, first end 102*a* of cylindrical shell 102 operably fits into a groove of first non-conductive end cap 304*a* having a length 304-*d*2 along the radial axis. First end cap 304*a* generally, in one embodiment, has a constant thickness 304-*t*1 along the longitudinal axis, and thus first end 102*a* of cylindrical shell 102 fits in the groove of first non-conductive end cap 304*a* having a thickness 304-*t*2 along the longitudinal axis. In one embodiment, end cap 304 further extends past the outer perimeter of cylindrical shell 102 by a distance 304-*d*1 along the longitudinal axis.

As described above, first non-conductive end cap 304, in one embodiment, is secured to cylindrical shell 102 via first brazing member 328*a*. First brazing member 328*a* includes a first portion 328*a*-1 that attaches to cylindrical shell 102, a second portion 328*a*-2, and a third portion 328*a*-3 that attaches to the exterior perimeter of first non-conductive end cap 304*a*. Second portion 328*a*-2 is, in one embodiment, angled such that a substantially smooth transition is formed between first portion 328*a*-1 and third portion 328*a*-3. Furthermore, second portion 328*a*-2 allows for thermal expansion differences between cylindrical shell 102 and end cap 304*a* while maintaining the brazed joint.

After cylindrical shell 102 and first non-conductive end cap 304*a* are placed together (e.g., first end 102*a* of cylindrical shell 102 placed into the groove of first non-conductive end cap 304*a*), first brazing member 328*a* is attached. Then, one or more sealing techniques are performed that cause first brazing member 328*a* to form a fluid seal between first non-conductive end cap 304*a* and cylindrical shell 102. For example, the inner cavity of cylindrical shell 102 may be pumped to create a vacuum seal. However, persons of ordinary skill in the art will recognize that any suitable technique may be performed to any brazing member of arc flash mitigation switch 300 that allows a fluid seal to be formed between the two or more parts attempting to be secured by the brazing member.

A benefit of employing brazing techniques is that less components are used to form arc flash mitigation switch 300. For example, arc flash mitigation switch 150 includes first and second sealing members 114*a* and 114*b*, which are secured to first and second end caps 104*a* and 104*b*, and include openings 1040*a* and 1040*b* that allow first and second conductive feed throughs 110*a* and 110*b* to extend there through. Arc flash mitigation switch 300, however, includes just first and second non-conductive end caps 304*a* and 304*b*, which have openings 3040*a* and 3040*b* that allow first and second conductive feed throughs 110*a*, 110*b* to extend there through. This reduces the number of parts or materials needed to create an arc flash mitigation switch, which may be advantageous in certain production schemes. However, persons of ordinary skill in the art will recognize that not all situations allow or enable the creation of arc flash mitigation switch 300 using first and second non-conductive end caps 304*a*, 304*b*, and it may be advantageous to include one or more additional components (e.g., sealing members 114*a*, 114*b*, non-conductive plate 134, etc.) instead.

Figure 15:
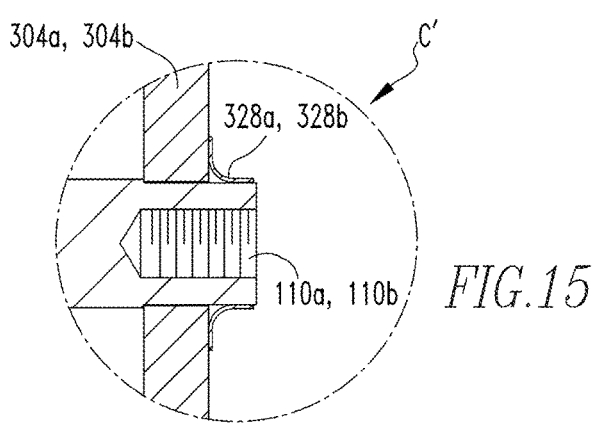
FIG. 15 is an illustrative diagram of a zoomed-in portion C' of arc flash mitigation switch 300 in accordance with an embodiment of the disclosed concept.

FIG. 15 is an illustrative diagram of a zoomed-in portion C' of arc flash mitigation switch 300 in accordance with an embodiment of the disclosed concept. First and second brazing members 328*a*, 328*b*, as seen in the illustrative embodiment, are substantially circular and provide a smooth transition between first and second conductive feed throughs 110*a*, 110*b*, and first and second non-conductive end caps 304*a*, 304*b*. Although first and second brazing members 328*a*, 328*b* are shown to be substantially curved between the connection to first, second non-conductive end caps 304*a*, 304*b* and first, second conductive feed throughs 110*a*, 110*b*, persons of ordinary skill in the art will recognize that any shape or design may be used so long as a fluid seal is formed by first and second brazing members 328*a*, 328*b*.

Figure 16:
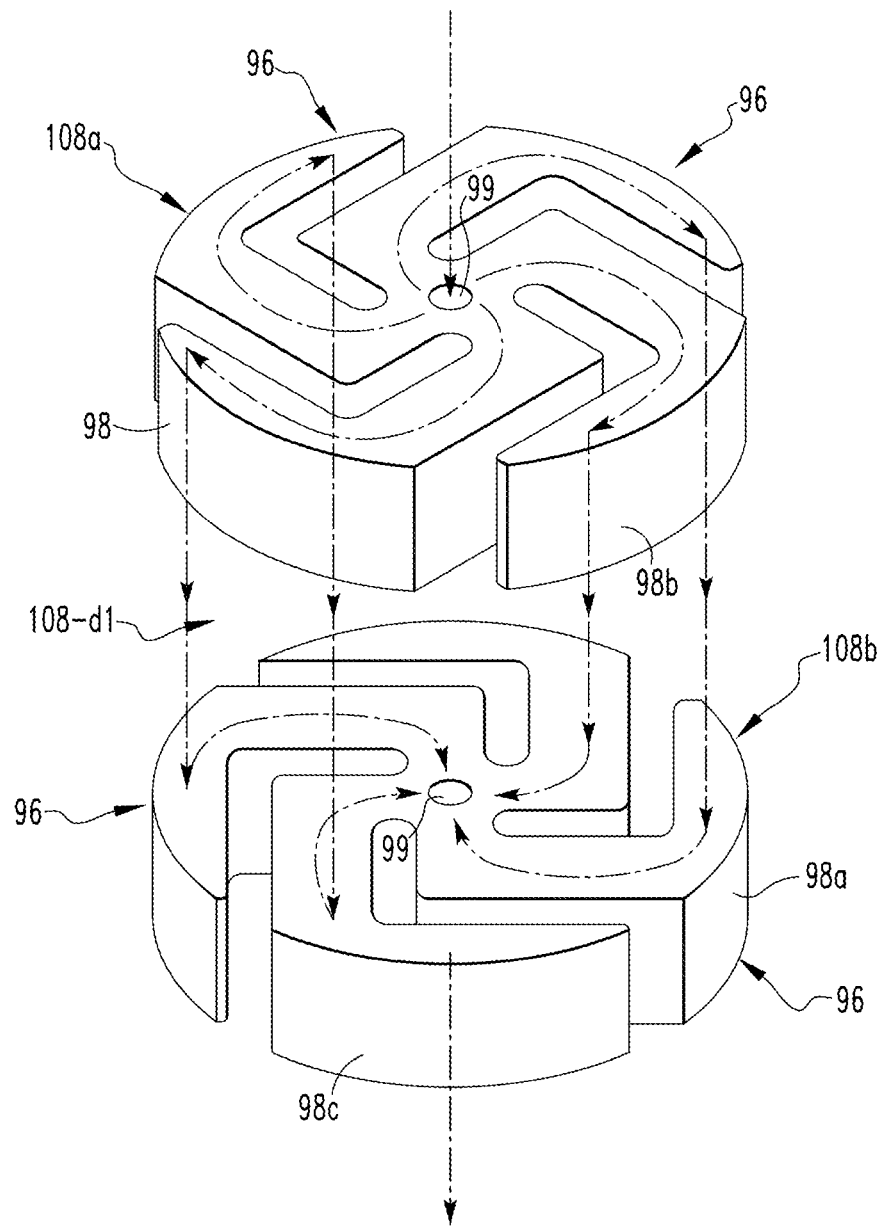
FIG. 16 is an illustrative diagram of electrodes 108a, 108b in accordance with an embodiment of the disclosed concept.

FIG. 16 is an illustrative diagram of electrodes 108*a*, 108*b* in accordance with an embodiment of the disclosed concept. In the exemplary, non-limiting embodiment, first electrode 108*a* and second electrode 108*b* are separated by gap 108-*d*1, and are aligned about a longitudinal axis 99. In one embodiment, gap 108-*d*1 may be ⅜", however any other separation may be used. Electrodes 108*a*, 108*b* are, in the illustrative embodiment, disks made of Elkonite™, which is a material made of copper and tungsten. However, electrodes 108*a*, 108*b* may be formed of any other material, or any composition of materials, including, but not limited to, stainless steel, steel, copper, and/or tungsten. A contact 98*a* formed by electrode 108*a*, 108*b* provides a substantial surface area that reduces arc erosion and employs known vacuum interrupter contact technology to rotate the arc flash, thereby minimizing erosion from the arc on contacts 98*a*. Furthermore, the design of electrodes 108*a*, 108*b* distributes thermal loading along the cylindrical shell 102.

This causes the magnetic field and the current path to change, such that the current moves outward on a contact pad pedal 98*b*, 98*c*, forming a reverse loop. The reverse loop creates a circumferential force on the arc at gap 108-*d*1 to rotate the arc around the periphery of each of contacts 98*a*. Electrodes 108*a*, 108*b* also include a generally L-shaped arm 96, which form contact pedals 98*b*, 98*c*, and being structured to rotate an arc about gap 108-*d*1. A more detailed description of electrodes 108*a* and 108*b*, and how the arc rotates about the electrodes to be quenched is detailed in commonly assigned U.S. patent application Ser. No. 14/181,929, filed on Feb. 18, 2014, which is incorporated herein by reference in its entirety.

Figure 17:
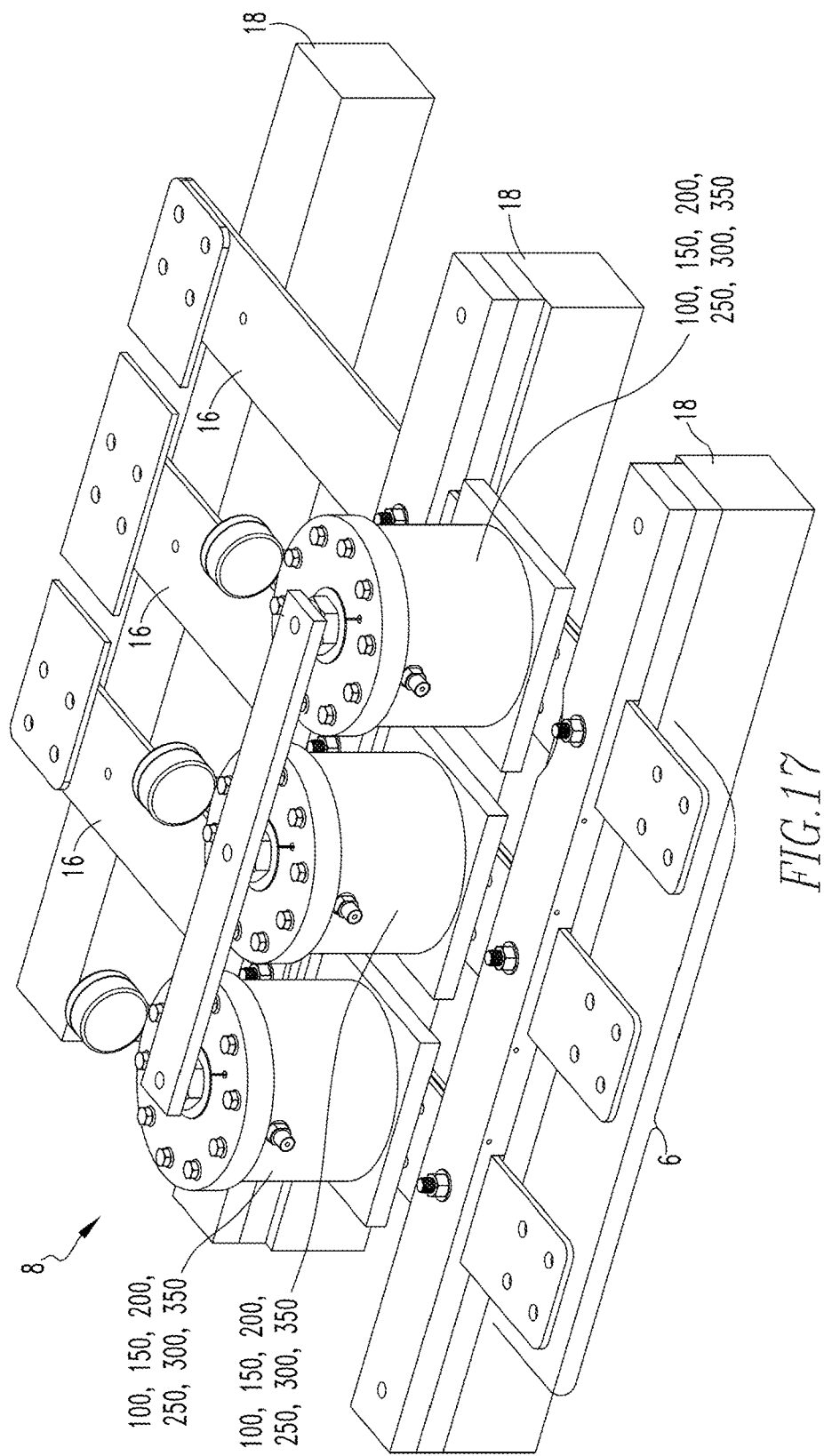
FIG. 17 is an exemplary, non-limiting, embodiment of a low voltage power system 8 in accordance with an embodiment of the disclosed concept.

FIG. 17 is an exemplary, non-limiting, embodiment of a low voltage power system 8 in accordance with an embodiment of the disclosed concept. Low voltage power system 8 includes, in one embodiment, three or more arc flash mitigation switches, such as arc flash mitigation switches 100, 150, 200, 250, 300, and/or 350. For example, low voltage power system 8 may include three arc flash mitigation switches 150, where each arc flash mitigation switch is located on one of low voltage power bus bars 16 between support bars 18. In the exemplary embodiment, a first end of arc flash mitigation switches 150 are electrically coupled to one another via support member 20, which connected to first conductive feed throughs 110*a* of each arc flash mitigation switch 150. Second non-conductive feed through 110*b* of each arc flash mitigation switch 150 then couples to one of low voltage support bars 16.

In one embodiment, low voltage power system 8 includes a mix of arc flash mitigation switches 100, 150, 200, 250, 300, and/or 350. For example, there may be two arc flash mitigation switches 100 and one arc flash mitigation switch 150. As another example, there may be two arc flash mitigation switches 250 and one arc flash mitigation switch 200. Furthermore, in one embodiment, low voltage power system 8 includes more than three of arc flash mitigation switches 100, 150, 200, 250, and 300, such as four, five, six, etc. switches. Persons of ordinary skill in the art will also recognize that although low voltage power system 8 has been described with reference to a low voltage design, a medium or high voltage scheme may be employed instead, and the use of low voltage is merely exemplary.

Figure 18:
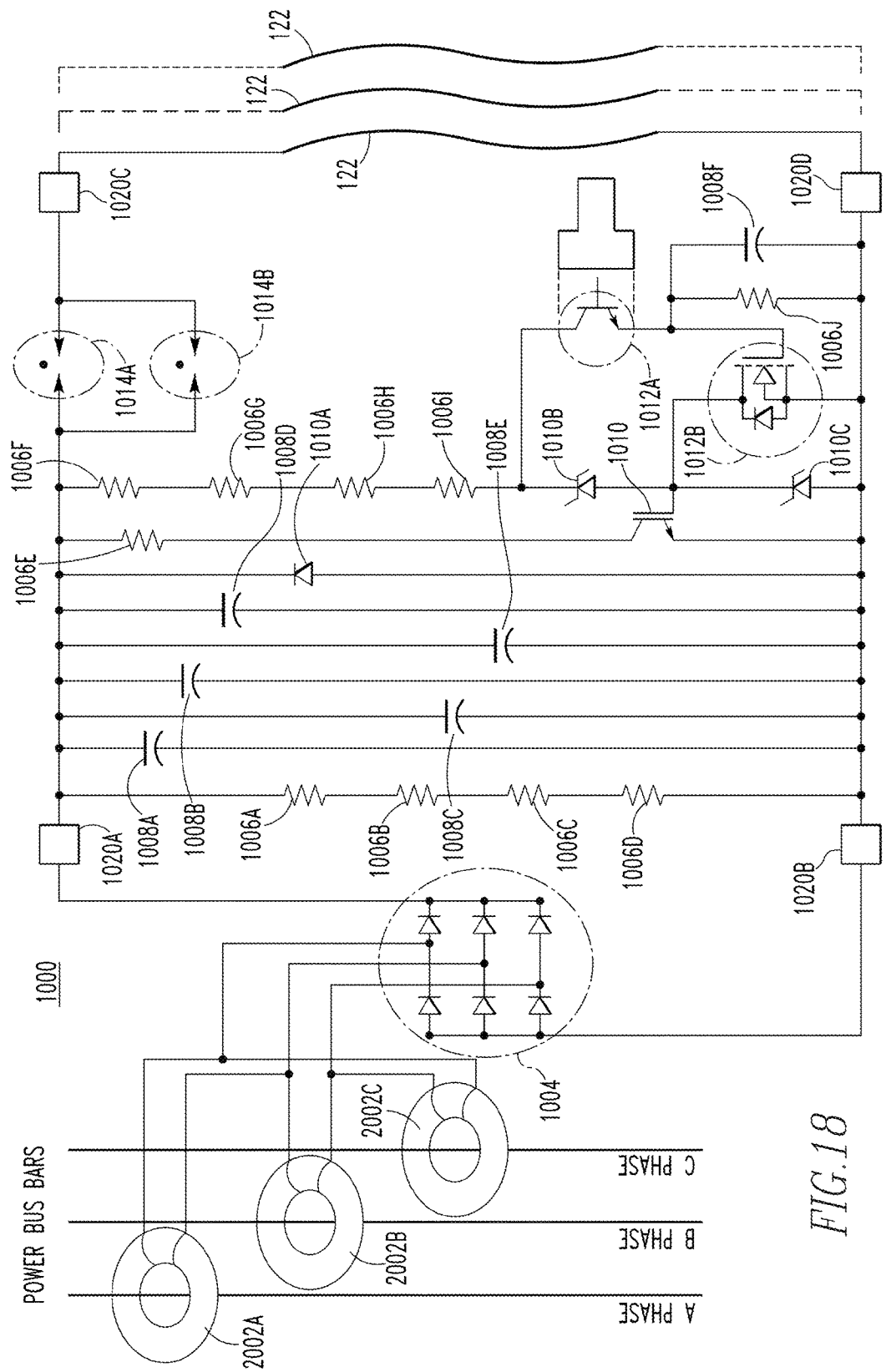
FIG. 18 is an illustrative diagram of an arc flash trigger circuit 1000 in accordance with an embodiment of the disclosed concept.

FIG. 18 are illustrative diagram of an arc flash trigger circuit 1000 in accordance with an embodiment of the disclosed concept. Arc flash trigger circuit 1000 optimally includes no auxiliary power source (e.g., a battery), and voltage is only imparted into arc flash trigger circuit when an arc flash event occurs. Arc flash trigger circuit 1000 operates so that when an external arc flash event occurs, it is recognized by arc flash trigger circuit 1000 such that the external arc flash is commutated by arc flash mitigation switch 100, 150, 200, 250, 300, and/or 350. Due to the fact that two arc flashes cannot exist in parallel to one another, by commutating the arc flash event in one of arc flash mitigation switches 100, 150, 200, 250, or 300, the external arc flash event is extinguished.

Arc flash trigger circuit 1000 includes current transformers 2002A-C. Current transformers 2002A-C may, for example, correspond to connectors to a separate current transformer. In one embodiment, each current transformer connector 2002A-C may connected in a wye configuration or a delta configuration. Current transformers 2002A-C are coupled to diodes 1004 to form a three-phase rectifier.

When an external arc flash event is detected on one or more of current transformers 2002A-C, that current transformer or transformers will produce a current that will charge capacitors 1008A-E. Capacitors 1008A-E, are, in one embodiment, high voltage capacitors arranged in parallel connection to one another. For example, capacitors 1008A-E may be rated to 1300 V. However, in another embodiment, capacitors 1008A-E are rated higher, for example, to 2-5 kV. In one embodiment, capacitors 1008A-E each have a capacitance of 10 μF, however this is merely exemplary, and any capacitance value may be used so long as the overall capacitance of arc flash trigger circuit 1000 is tuned accordingly to accumulate and store sufficient energy to properly activate trigger ribbons 122 of FIG. 18 in arc flash mitigation switches 100, 150, 200, 250, 300, and/or 350. Persons of ordinary skill in the art will also recognize that any number of capacitors may be implemented within arc flash trigger circuit 1000, and the use of capacitors 1008A-E is merely exemplary.

Capacitors 1008A-E of arc flash trigger circuit 1000 are selected such that they can withstand a substantially high voltage (e.g., greater than 1000 V), while still being able to charge in a set amount of time depending on the fault current level. In one exemplary embodiment, capacitors 1008A-E are selected such that they charge between 0.5-2 ms. For example, capacitors 1008A-E may be selected such that they charge in 1 ms. Due to the fact that the larger the capacitance of capacitors 1008A-E, the longer the charge time, selecting the appropriate combination of capacitors having suitable voltage rating is guided by the total charge time desired for arc flash trigger switch 1000.

Bleed down resistors 1006A-D are included in arc flash trigger circuit 1000, in one embodiment, for safety. In static conditions, extraneous charges may build up on capacitors 1008A-E. Bleed down resistors 1006A-D ensure that the extraneous static charges don't build up, or don't build up too much, on capacitors 1008A-E.

Bleed down resistors 1006A-D are, in the illustrated exemplary embodiment, connected in series and have a substantially same resistance. However, persons of ordinary skill in the art will recognize that more or less resistors may be included, and the resistors may be combined in any suitable fashion, having any suitable resistance, power, and/or voltage rating such that the combination prevents excess static charge buildup on capacitors 1008A-E.

Arc flash trigger circuit 1000 includes, in one embodiment, diode 1010A, which serves as a protection device for all other components in arc flash trigger circuit 1000. In one embodiment, diode 1010A will begin to conduct at a substantially high voltage slightly below the rated voltage of capacitors 1008A-E. For example, diode 1010A may be a Zener diode that begins to conduct at 1200 V. If capacitors 1008A-E are rated to 1300 V, for example, then diode 1010A will see the voltage first as it has a lower conducting voltage than diodes 1008A-E. Furthermore, diode 101A may also serve as a flyback device that mitigates voltage inversion on capacitors 1008A-E due to follow-on current from inductance in trigger ribbons 122 and the conductors connecting ribbons 122 to arc flash trigger circuit 1000 after arc flash mitigation device 100, 150, 200, 250, 300, and/or 350 has been triggered.

Arc flash trigger circuit 1000 also needs to ensure that circuit 1000 does not trigger just when one or more of current transformers 2002A-C sees a high current, as this may not necessarily correspond to an external arc flash event occurring. In one embodiment, arc flash trigger circuit 1000 includes transistor 1010. Transistor 1010, in normal operation, is turned on, poling through resistors 1006F-I and a Zener diode 1010B. By doing this, a low-impedance discharge path is established for current coming out of current transformers 2002A-C. The low-impedance discharge path keeps capacitors 1008A-E from charging due to a non-arc flash event, and allows the current to dissipate in a resistor 1006E.

Arc flash trigger circuit 1000 also includes Zener diode 1010C, which is in series with Zener diode 1010B, in one embodiment. Transistor 1010, in one embodiment, is an insulated gate bipolar transistor, or IGBT, and the gate can be damaged if the gate-to-emitter voltage exceeds a certain voltage. Diode 1010C, in one embodiment, regulates the maximum gate voltage. For example, diode 1010C may ensure that the maximum gate voltage does not exceed 20 V.

If, however, an arc flash event is occurring, an optical transistor 1012A will see light that is piped into arc flash trigger circuit 1000 via a fiber optical cable. When transistor 1012A sees light, it will turn a transistor 1012B on, which, in one embodiment, will open transistor 1010 allowing all the charge coming from current transformers 2002A-C to accumulate on capacitors 1008A-E. Capacitors 1008A-E will then charge up to the point that one of gas-discharge tubes 1014A, 1014B break down and begin conducting energy to the trigger ribbons in the arc flash mitigation switch (e.g., ribbon 122 of FIG. 5). It should be noted that, although two gas-discharge tubes 1014A and 1014B are shown in arc flash trigger switch 1000, only one will actually break down.

Gas-discharge tubes 1014A and 1014B are, in one exemplary embodiment, two electrodes with an inert gas, such that they have a prescribed arc gap at a certain voltage. When the voltage is achieved, the electrodes break down which initiates an arc that allows the gas-discharge tube to conduct at extremely high currents (e.g., 1-5 kA).

Arc flash trigger circuit 1000 is optimally designed as an inherent "AND" gate, in that both optical transistor 1012A needs to see light and a high current on one or more of current transformers 2002A-C must be present for a trigger current to be sent to a trigger ribbon within the arc flash mitigation switch (e.g., arc flash mitigation switch 100). This advantageous design eliminates the need for an electronic AND gate and an auxiliary power source that maintains charge on the system. Furthermore, arc flash trigger circuit 1000 allows for capacitors 1008A-E to be charged via current transformers 2002A-C, a feature vastly different than previous circuits designed for similar purposes.

As previously mentioned, the trigger current sent to the trigger ribbon due to the detected light and capacitor charging advantageously occurs in 2 ms or less (e.g., 0.1-2 ms). However, there is a slight delay in optical transistor 1012A from when the light is detected by the optical fiber to when the signal is reached by optical transistor 1012A. However, this delay is insignificant in comparison to the actual triggering time of 0.5-2 ms, and thus does not produce any adverse effects. Furthermore, the delay may also be due to capacitor 1008F and resistor 1006J, which serve to reduce and/or inadvertent operation of transistor 1012B due to noise from sources such as electromagnetic interference ("EMI").

The light signal detected by optical transistor 1012A may be set to a threshold value by tuning resistor 1006J to a suitable level. As the resistance of resistor 1006J is much less than the gate resistance of transistor 1012B, the threshold value for transistor 1012A may be set based on the resistance value of resistor 1006J.

In one embodiment, arc flash trigger circuit 1000 includes multiple instances of transistor 1012A aligned in parallel with one another. As each transistor 1012A is connected to a fiber optic cable piped from a portion of the switchgear, multiple transistors 1012A allow for multiple fiber optic cables to be piped to various portions of the switchgear. For example, a switchgear may include multiple isolated compartments, and thus a single arc flash trigger circuit 1000 may be used to detect arc flash events in any switchgear compartment, and relay the light event to a corresponding optical trigger 1012A.

In one embodiment, bleed down resistors 1006A-D and/or resistors 1006F-I may be reduced to a single resistor, or, in one embodiment, may not be included at all, depending on the overall structure of arc flash trigger circuit 1000. In another embodiment, diode 1010A may not be included as, if components of trigger circuit 1000 are damaged as a result of a single operation, the entire arc flash trigger circuit 1000 may be replaced. Therefore, diode 1010A may not be required. Furthermore, in at least one embodiment, only one gas discharge tube 1014A, 1014B may be included, as only one will be used in the case of a triggering event. Multiple tubes can be used for redundancy and/or extended life if used for multiple trigger events, however, in some embodiment, multiple tubes may not be required.

Connections to a printed circuit board will occur at connections 1020A and 1020B, in one embodiment, and connections 1020C and 1020D will connect to a trigger ribbon located within an arc flash mitigation switch. For example, connections 1020C and 1020D will connect to trigger ribbon 122 of arc flash mitigation switch 150 of FIG. 5 at points x and y, respectively. Furthermore, in at least one embodiment, connections 1020C and 1020D will connect to more than one (e.g., two or more) arc flash mitigation switches 100, 150, 200, and/or 250, such that multiple arc flash mitigation switches may be triggered at a substantially same time in response to an external arc fault event.

Figure 19:
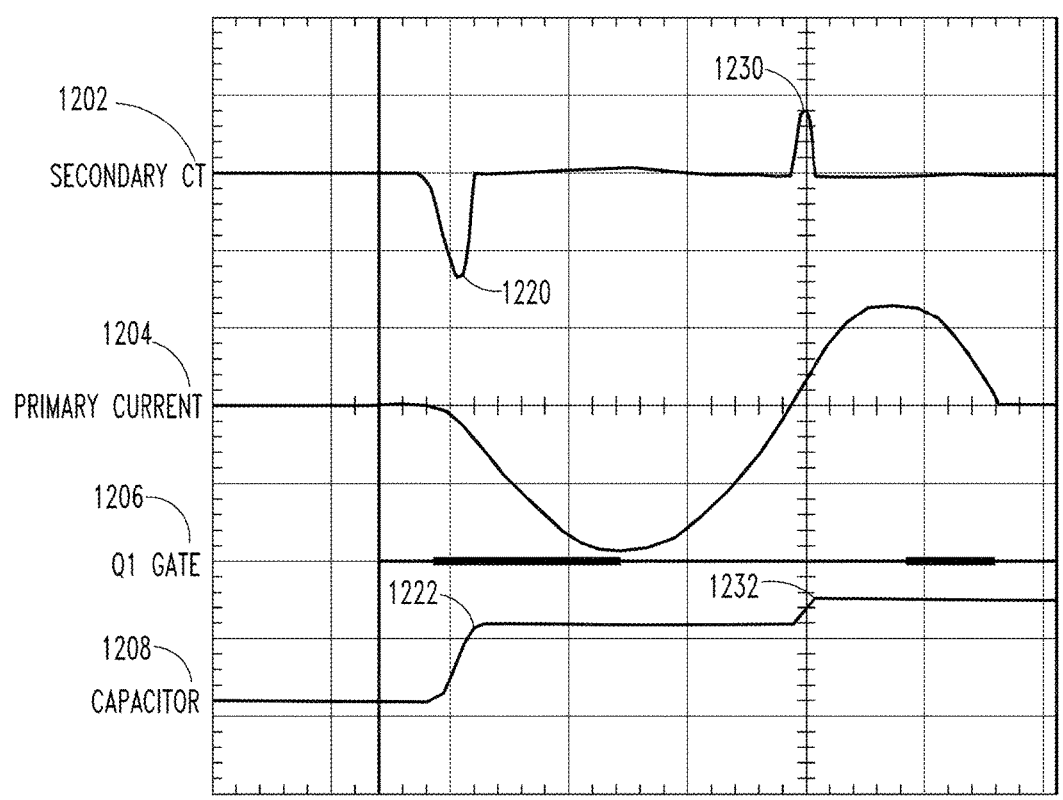
FIG. 19 is an illustrative diagram of outputs from various components within arc flash trigger circuit 1000 in accordance with an embodiment of the disclosed concept.

FIG. 19 is an illustrative diagram of outputs from various components within arc flash trigger circuit 1000 in accordance with an embodiment of the disclosed concept. An oscilloscope output 1200 includes a secondary current transformer plot 1202, a primary current plot 1204, a transistor plot 1206, and a capacitor plot 1208.

Primary current plot 1204 corresponds, in one embodiment, to an actual arc fault current occurring due to an external arc flash event. This is what the main conductor bus (e.g., low voltage power bus bars 16 of FIG. 1) will see. Furthermore, primary current plot corresponds to a current waveform that current transformers 2002A-C will have flow through them.

Secondary current transformer plot 1202, in one embodiment, corresponds to an output that current transformers 2002A-C see (e.g., a high current), and a current pulse 1220 and 1230 are a result of the high primary current. For example, the pulses are aligned with the zero crossings of primary current 1204. Current transformers 2002A-C saturate when the current reaches extremely high levels, and thus, capacitors 1008A-E charge directly in response to each of pulses 1220 and 1230.

Capacitor plot 1208 corresponds, in one embodiment, to the charge on capacitors 1008A-E in response to each current pulse 1220 and 1230. As seen in the illustrative, non-limiting, exemplary embodiment, at each pulse, the voltage of the capacitor steps up. For example, after pulse 1220, capacitor charge 1208 steps up to a first level 1222. After pulse 1230, capacitor charge 1208 steps up to level 1232. In one embodiment, level 1232 corresponds to a threshold value for the capacitor, such that it cannot charge up any further.

Transistor plot 1206 corresponds, in one embodiment, to an output of a drain pin of transistor 1012B. Accordingly, in the exemplary embodiment, the gate voltage for transistor 1010 stays at zero, corresponding to capacitors 1008A-E charging up.

Figure 20:
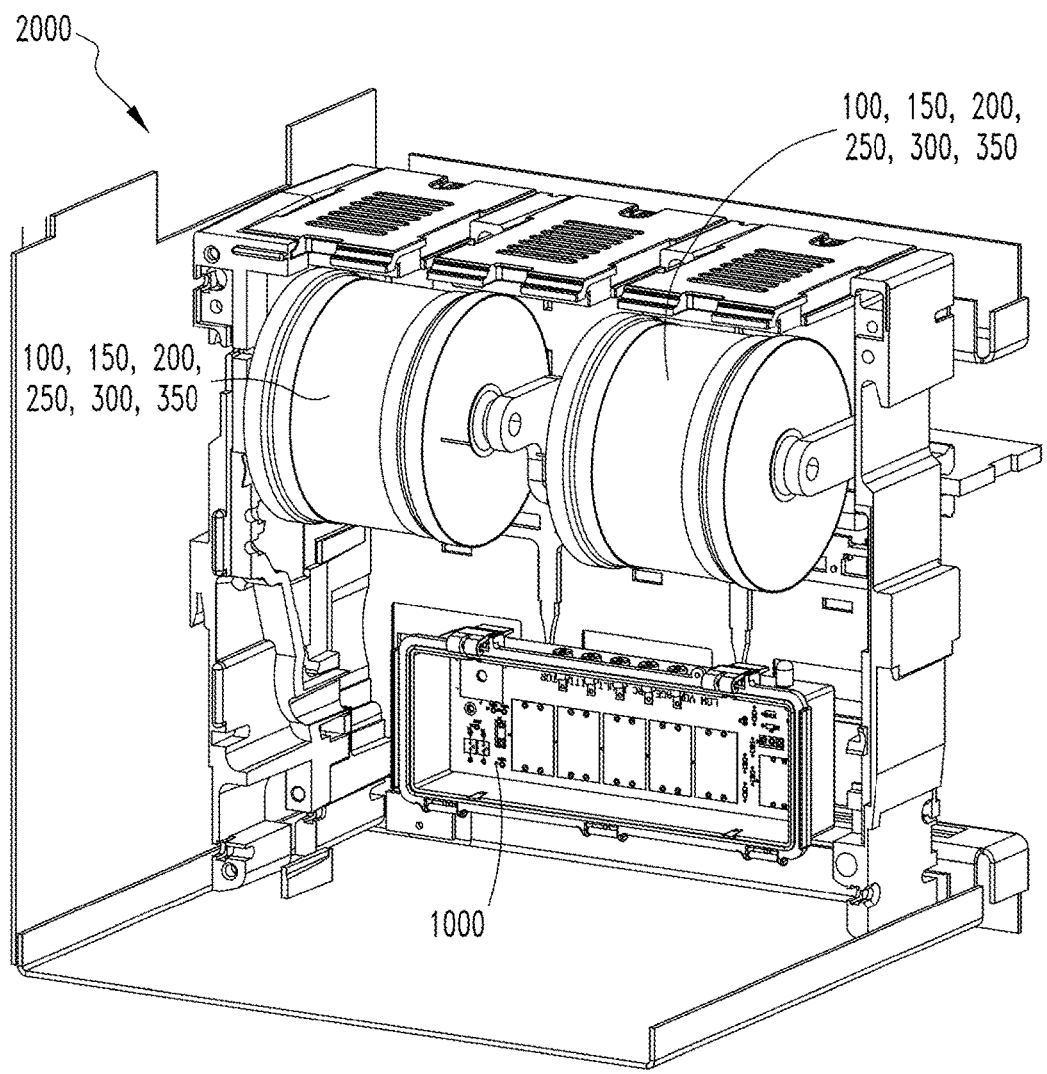
FIGS. 20 and 21 are illustrative diagrams of a rack-in system including arc flash mitigation switches 100, 150, 200, 250, 300, and/or 350, and arc flash trigger circuit 1000 in accordance with an embodiment of the disclosed concept.
Figure 21:
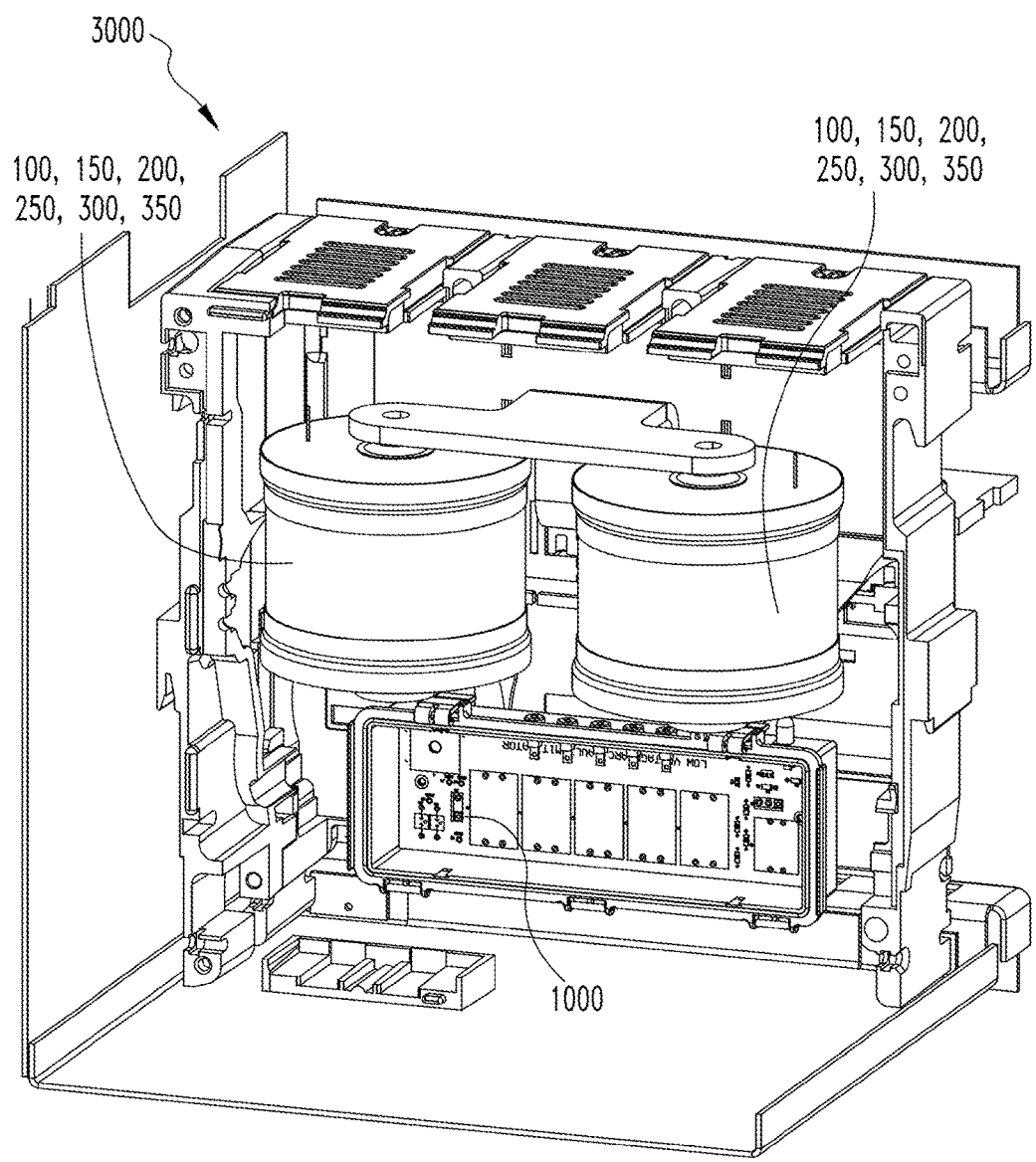

FIGS. 20 and 21 are illustrative diagrams of a rack-in system including arc flash mitigation switches 100, 150, 200, 250, 300, and/or 350 and arc flash trigger circuit 1000 in accordance with an embodiment of the disclosed concept. A rack-in system 2000, in the exemplary illustrative embodiment, includes two arc flash mitigation switches 100, 150, 200, 250, 300, and/or 350 which are horizontally aligned with one another. Rack-in system 2000 also includes arc flash trigger circuit 1000, which is operable to commutate an external arc flash event into arc flash mitigation switches 100, 150, 200, 250, 300, and/or 350 in response to an arc flash event being detected (e.g., high current along capacitors 1008A-E and light detected by optical transistor 1012B). A rack-in system 3000, in the exemplary illustrative embodiment, is substantially similar to rack-in system 2000, with the exception that the former includes two arc flash mitigation switches that are vertically aligned. Although FIGS. 20 and 21 describe a horizontal and vertical alignment of two arc-flash mitigation switches, persons of ordinary skill in the art will recognize that any number of arc-flash mitigation switches may be used, and any number of different geometries may be used. Such geometries include, but are not limited to, vertically hung edge-to-edge bus, vertically hung face-to-face bus, horizontal face-to-face bus, "L"-bracket connections, dog-leg connections, or any other type of geometry, or any combination thereof. Furthermore, any relative positioning of each arc-flash mitigation switch to one another may be used, any bus width, bus thickness, and/or bus material may be used, and the arc-flash mitigation switches may be placed within any type of compartment or cassette as recognized by persons of ordinary skill in the art.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the disclosed concept has been described in detail for the purpose of illustration based on what is currently considered to be the most practical and preferred embodiments, it is to be understood that such detail is solely for that purpose and that the disclosed concept is not limited to the disclosed embodiments, but, on the contrary, is intended to cover modifications and equivalent arrangements that are within the spirit and scope of the appended claims. For example, it is to be understood that the present disclosed concept contemplates that, to the extent possible, one or more features of any embodiment can be combined with one or more features of any other embodiment.

What is claimed is:

1. An arc flash mitigation switch comprising:
a cylindrical shell having a substantially constant thickness annularly about a longitudinal axis, the cylindrical shell forming an inner cavity;
a first and second electrode centered about a radial axis of the cylindrical shell and the longitudinal axis of the cylindrical shell;
a first end cap located at a first end of the cylindrical shell and a second end cap located at a second end of the cylindrical shell, wherein:
the first end cap comprises a first circular opening about the longitudinal axis having a first diameter; and
the second end cap comprises a second circular opening about the longitudinal axis having a second diameter;
a first conductive feed through and a second conductive feed through aligned about the longitudinal axis, the first conductive feed through extending through the first circular opening to the first electrode and the second conductive feed through extending through the second circular opening to the second electrode;
a trigger feed through comprising a first portion extending through the first end cap and a second portion electrically coupled to an inner surface of the first electrode that faces an inner surface of the second electrode;
a first sealing member comprising:
a base that is substantially circular comprising an inner surface and an outer surface, wherein the outer surface of the base of the first sealing member abuts an inner surface of the first end cap; and a shaft that extends from the inner surface of the base of the first sealing member through the first circular opening of the first end cap; and a second sealing member comprising:
a base that is substantially circular comprising an inner surface and an outer surface, wherein the outer surface of the base of the second sealing member abuts an inner surface of the second end cap; and
a shaft that extends from the inner surface of the base of the second sealing member through the second circular opening of the second end cap.

2. The arc flash mitigation switch of claim 1, wherein the first sealing member and the second sealing member comprise a non-conductive material.

3. The arc flash mitigation switch of claim 2, wherein the non-conductive material comprises one of: ceramic and epoxy resin comprising fiberglass.

4. The arc flash-mitigation switch of claim 1, wherein:
the shaft of the first sealing member further comprises an outer diameter substantially equal to the first diameter of the first end cap and an inner diameter substantially equal to a diameter of the first conductive feed through such that the first conductive feed through extends through an opening formed by the inner diameter of the shaft of the first sealing member; and
the shaft of the second sealing member further comprises an outer diameter substantially equal to the second diameter of the second end cap and an inner diameter substantially equal to a diameter of the second conductive feed through such that the second conductive feed through extends through an opening formed by the inner diameter of the shaft of the second sealing member.

5. The arc flash mitigation switch of claim 1, wherein the first electrode and the second electrode are oriented such that a gap exists between the inner surface of the first electrode and the inner surface of the second electrode.

6. The arc flash-mitigation switch of claim 1, wherein:
the first portion of the trigger feed through is connected to an arc flash mitigation circuit; and
the second portion of the trigger feed through comprises a conductive ribbon.

7. The arc flash mitigation switch of claim 6, wherein:
the first portion of the trigger feed through comprises a copper wire; and
the conductive ribbon comprises a copper ribbon.

8. The arc flash mitigation switch of claim 1, wherein:
the first conductive feed through is electrically coupled at a first end to a current source and at a second end to the first electrode; and
the second conductive feed through is electrically coupled at a first end to the current source and at a second end to the second electrode.

9. The arc flash mitigation switch of claim 1, wherein at least one of the first electrode and second electrode comprise at least one of tungsten, copper, and steel.

10. An arc flash mitigation switch comprising:
a cylindrical shell having a substantially constant thickness annularly about a longitudinal axis, the cylindrical shell forming an inner cavity;
a first and second electrode centered about a radial axis of the cylindrical shell and the longitudinal axis of the cylindrical shell;
a first end cap located at a first end of the cylindrical shell and a second end cap located at a second end of the cylindrical shell, wherein:
the first end cap comprises a first circular opening about the longitudinal axis having a first diameter; and
the second end cap comprises a second circular opening about the longitudinal axis having a second diameter;
a first conductive feed through and a second conductive feed through aligned about the longitudinal axis, the first conductive feed through extending through the first circular opening to the first electrode and the second conductive feed through extending through the second circular opening to the second electrode;
a trigger feed through comprising a first portion extending through the first end cap and a second portion electrically coupled to an inner surface of the first electrode that faces an inner surface of the second electrode; and
a layer lining a portion of the inner cavity of the cylindrical shell proximate the first electrode and the second electrode.

11. The arc flash mitigation switch of claim 10, wherein the layer comprises tungsten.

12. The arc flash mitigation switch of claim 10, wherein:
the second end of the first conductive feed through protrudes into the first electrode; and
the second end of the second conductive feed through protrudes into the second electrode.

13. The arc flash-mitigation switch of claim 10, wherein:
the first portion of the trigger feed through is connected to an arc flash mitigation circuit; and
the second portion of the trigger feed through comprises a conductive ribbon.

14. The arc flash mitigation switch of claim 13, wherein:
the first portion of the trigger feed through comprises a copper wire; and
the conductive ribbon comprises a copper ribbon.

15. The arc flash mitigation switch of claim 10, wherein:
the first conductive feed through is electrically coupled at a first end to a current source and at a second end to the first electrode; and
the second conductive feed through is electrically coupled at a first end to the current source and at a second end to the second electrode.

16. The arc flash mitigation switch of claim 10, wherein at least one of the first electrode and second electrode comprise at least one of tungsten, copper, and steel.

17. An arc flash mitigation switch comprising:
a cylindrical shell having a substantially constant thickness annularly about a longitudinal axis, the cylindrical shell forming an inner cavity;
a first and second of electrode centered about a radial axis of the cylindrical shell and the longitudinal axis of the cylindrical shell;
a first end cap located at a first end of the cylindrical shell and a second end cap located at a second end of the cylindrical shell, wherein:
the first end cap comprises a first circular opening about the longitudinal axis having a first diameter; and
the second end cap comprises a second circular opening about the longitudinal axis having a second diameter;
a first conductive feed through and a second conductive feed through aligned about the longitudinal axis, the first conductive feed through extending through the first circular opening to the first electrode and the second conductive feed through extending through the second circular opening to the second electrode;
a trigger feed through comprising a first portion extending through the first end cap and a second portion electrically coupled to an inner surface of the first electrode that faces an inner surface of the second electrode;

a first non-conductive layer located on an outer surface of the first end cap that is substantially ring-shaped; and a second non-conductive layer located on an outer surface of the second end cap that is substantially ring-shaped.

18. The arc flash mitigation switch of claim 17, wherein the first non-conductive layer and the second non-conductive layer both comprise a high electrical grade fiberglass material.

19. An arc flash mitigation switch comprising:

a cylindrical shell having a substantially constant thickness annularly about a longitudinal axis, the cylindrical shell forming an inner cavity;

a first and second of electrode centered about a radial axis of the cylindrical shell and the longitudinal axis of the cylindrical shell;

a first end cap located at a first end of the cylindrical shell and a second end cap located at a second end of the cylindrical shell, wherein:

the first end cap comprises a first circular opening about the longitudinal axis having a first diameter; and the second end cap comprises a second circular opening about the longitudinal axis having a second diameter;

a first conductive feed through and a second conductive feed through aligned about the longitudinal axis, the first conductive feed through extending through the first circular opening to the first electrode and the second conductive feed through extending through the second circular opening to the second electrode;

a trigger feed through comprising a first portion extending through the first end cap and a second portion electrically coupled to an inner surface of the first electrode that faces an inner surface of the second electrode; and a non-conductive disk lining an inner surface of the first end cap, the non-conductive disk having a first opening where a first sealing member and the first conductive feed through extend through.

* * * * *